(12) United States Patent
Gonzalez et al.

(10) Patent No.: US 12,325,158 B2
(45) Date of Patent: Jun. 10, 2025

(54) MOLDED FIBER PRODUCT PRODUCTION LINE UTILIZING FLUID TRIM OPERATION

(71) Applicant: Congruens Group, LLC, San Carlos, CA (US)

(72) Inventors: Pablo Gonzalez, San Francisco, CA (US); Paul Leeman, Campbell, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

(21) Appl. No.: 18/239,035

(22) Filed: Aug. 28, 2023

(65) Prior Publication Data
US 2024/0051193 A1    Feb. 15, 2024

Related U.S. Application Data

(62) Division of application No. 17/095,244, filed on Nov. 11, 2020, now Pat. No. 11,738,485.

(60) Provisional application No. 62/933,593, filed on Nov. 11, 2019.

(51) Int. Cl.
| | |
|---|---|
| B29C 41/50 | (2006.01) |
| B29C 41/16 | (2006.01) |
| B29C 41/38 | (2006.01) |
| B29C 43/02 | (2006.01) |
| B29K 105/00 | (2006.01) |

(52) U.S. Cl.
CPC ............ B29C 41/50 (2013.01); B29C 41/16 (2013.01); B29C 41/38 (2013.01); B29C 43/02 (2013.01); *B29K 2105/0058* (2013.01)

(58) Field of Classification Search
CPC ......... B29C 41/50; B29C 41/16; B29C 41/38; D21J 7/00
See application file for complete search history.

(56) References Cited

U.S. PATENT DOCUMENTS

| | | | |
|---|---|---|---|
| 2003/0160365 A1* | 8/2003 | Brown | B29C 39/10 |
| | | | 264/553 |
| 2005/0150624 A1 | 7/2005 | Toh et al. | |
| 2005/0153013 A1 | 7/2005 | Lee | |
| 2007/0042075 A1 | 2/2007 | Cavallaro | |
| 2015/0204020 A1 | 7/2015 | Gordon et al. | |
| 2015/0258722 A1 | 9/2015 | Hou | |
| 2015/0292154 A1* | 10/2015 | Zheng | D21F 7/006 |
| | | | 162/253 |
| 2017/0197334 A1 | 7/2017 | Kuo et al. | |
| 2018/0339826 A1* | 11/2018 | Chung | B65D 65/466 |

FOREIGN PATENT DOCUMENTS

| | | |
|---|---|---|
| CN | 101342779 A | 1/2009 |
| CN | 103603234 A | 2/2014 |
| CN | 104827519 A | 8/2015 |
| CN | 104831590 A | 8/2015 |

(Continued)

*Primary Examiner* — Virak Nguon
(74) *Attorney, Agent, or Firm* — Goodwin Procter LLP

(57) ABSTRACT

A molded fiber part former includes a first forming mold defining a first mold area and at least one fluid inlet. The molded fiber part former also includes a wall substantially surrounding the first mold area. The molded fiber part former includes a fluid channel disposed adjacent to and surrounding the wall, wherein the channel is fluidically connected to the at least one fluid inlet and defines a fluid channel outlet.

9 Claims, 15 Drawing Sheets

(56) References Cited

FOREIGN PATENT DOCUMENTS

| | | | | |
|---|---|---|---|---|
| CN | 204622206 U | | 9/2015 | |
| CN | 204690510 U | | 10/2015 | |
| CN | 107858867 A | * | 3/2018 | ................ D21J 3/12 |
| CN | 107881856 A | | 4/2018 | |
| CN | 107915044 A | * | 4/2018 | ........... B65G 47/914 |
| CN | 207404482 U | | 5/2018 | |
| CN | 111254754 A | | 6/2020 | |
| CN | 111287022 A | | 6/2020 | |
| CN | 111395050 A | | 7/2020 | |
| CN | 111395051 A | | 7/2020 | |
| CN | 114096713 A | | 2/2022 | |
| EP | 1240975 A1 | | 9/2002 | |
| EP | 2937462 A1 | | 10/2015 | |
| WO | WO-9922069 A1 | | 5/1999 | |
| WO | WO-03044279 A1 | | 5/2003 | |
| WO | WO-2005012640 A1 | | 2/2005 | |
| WO | WO-2006057610 A2 | | 6/2006 | |
| WO | WO-2015019061 A1 | | 2/2015 | |

\* cited by examiner

MOLDED FIBER PRODUCT PRODUCTION LINE UTILIZING FLUID TRIM OPERATION

CROSS-REFERENCE TO RELATED APPLICATIONS

This application is a divisional of U.S. application Ser. No. 17/095,244, filed Nov. 11, 2020, and titled "MOLDED FIBER PRODUCT PRODUCTION LINE," which claims priority to and the benefit of U.S. Provisional Patent Application Ser. No. 62/933,593, filed Nov. 11, 2019, entitled "MOLDED FIBER PRODUCTION LINE UTILIZING WATER TRIM OPERATION," each of which is hereby incorporated by reference herein its entirety.

INTRODUCTION

Pollution caused by single use plastic containers and packaging materials is now a recognized worldwide problem. Replacing single use packaging with biodegradable and compostable materials is proposed as one way to reduce plastic pollution. However, for a new environmentally-friendly replacement to be successful, it must be competitive in both cost and performance to the incumbent plastic technologies it is to replace.

By way of brief background, molded paper pulp (also referred to as molded fiber) has been used since the 1930s to make containers, trays and other packages. Paper pulp can be produced from recycled materials such as old newsprint and corrugated boxes or directly from tree and other plant fibers. Today, molded pulp packaging is widely used for electronics, household goods, automotive parts and medical products.

Molds are made by machining a metal tool in the shape of a mirror image, if you will, of the finished part. Holes are drilled through the tool and then a screen is attached to its surface. The vacuum is drawn through the holes while the screen prevents the pulp from clogging the holes. To make the molded fiber part, the mold is immersed into a slurry of fiber and a pressure gradient is applied and water is drawn through the holes in the mold. Fiber from the slurry is collected on the screen and, after the fiber layer is formed to a desired thickness, the mold with the molded fiber part is removed from the slurry. The molded fiber part is then disengaged from the mold and may be subjected to subsequent processing (e.g., forming, heating, drying, top coating, and the like).

Molded fiber packaging products can be biodegradable and compostable. However, presently known fiber technologies are not well suited for use in food packaging where the food can come into contact with the packaging, particularly meat and poultry containers, prepared food, produce, microwavable food containers, and lids and cups for beverage containers.

SUMMARY

In one aspect, the technology relates to a molded fiber part former including: a first forming mold defining a first mold area and at least one fluid inlet; a wall substantially surrounding the first mold area; and a fluid channel disposed adjacent to and surrounding the wall, wherein the channel is fluidically connected to the at least one fluid inlet and defines a fluid channel outlet. In an example, the molded fiber part former further including: a sealing ring at least partially covering the fluid channel outlet, wherein the sealing ring is spaced apart from the wall so as to at least partially define a fluid slot therebetween. In another example, the sealing ring is fixed to the first mold part. In yet another example, the sealing ring is removably fixed to the first mold part. In still another embodiment, the fluid channel defines a maximum channel width and the fluid slot defines a maximum slot width less than the maximum channel width.

In another example of the above aspect, the fluid slot is disposed so as to direct a flow of fluid in a direction substantially orthogonal to an uppermost extent of the wall. In an example, the molded fiber part former further including: a second forming mold defining a mating mold area configured to mate with the first mold area of the first forming mold. In another example, the second forming mold includes an outer rim surrounding the mating mold area, and wherein when the first mold area and the mating mold area are in a mating configuration, the outer rim is configured to deflect a flow of fluid ejected from the fluid channel in a direction away from the first mold area and the mating mold area. In yet another example, the outer rim is curved. In still another example, the at least one fluid inlet includes a plurality of fluid inlets.

In another example of the above aspect, the plurality of fluid inlets are distributed about an outer edge of the first forming mold. In an example, the plurality of fluid inlets are each fluidically connected to the fluid channel.

In another aspect, the technology relates to a method of producing a molded fiber part, the method including: disposing a first forming mold into a slurry tank including a plurality of fibers and a liquid, wherein the first forming mold includes a first mold area, at least one fluid inlet, and a plurality of vacuum channels; actuating a vacuum communicatively coupled to the plurality of vacuum channels to draw at least some of the plurality of fibers onto the forming mold to form a partially-formed molded fiber part; removing the first forming mold from the slurry tank; applying a compressive pressure to the partially-formed molded fiber part with a second forming mold; separating a waste trim from the partially-formed molded fiber part substantially simultaneously with applying the compressive pressure; and subsequent to separating the waste trim, transferring the partially-molded fiber part to a downstream station. In an example, separating the waste trim includes receiving a fluid from the at least one fluid inlet and ejecting the fluid from a fluid outlet at least partially defined by the first forming mold. In another example, separating the waste trim includes ejecting a fluid from a fluid outlet at least partially defined by the second forming mold. In yet another example, the plurality of vacuum channels are fluidically connected to the first mold area, and wherein the at least one fluid inlet is fluidically connected to a fluid outlet disposed on a location on the first forming mold remote from the first mold area. In still another example, the method further including directing the ejected fluid away from the first mold area.

In another example of the above aspect, the method further including catching the waste trim and fluid. In an example, the method further including subsequent to catching the waste trim and the fluid, reprocessing the waste trim and the fluid. In another example, separating the waste trim includes ejecting a fluid towards an edge of the partially-formed molded fiber part. In yet another example, the fluid is ejected in a substantially annular stream.

In another aspect, the technology relates to a molded fiber part production line including: (a) a forming station including: a slurry tank configured to receive a fiber slurry including a plurality of fiber and a liquid; a forming mold including a mold plate defining a plurality of vacuum channels and at least one fluid trim channel; and a mold actuation system for adjusting a position of the mold plate relative to the slurry tank; (b) a part transfer system including: a part transfer feature defining a plurality of part vacuum channels; and a conveyance mechanism for moving the part transfer feature from a first position in engagement with the forming mold to a second position; (c) a press station including: a core mold; a cavity mold compatible with the core mold; and a press actuation system for adjusting a position of the core mold relative to the cavity mold, wherein at least one of the core mold and the cavity mold defines a plurality of vacuum channels and at least one heating element, and wherein in the second position, the part transfer feature is in engagement with at least one of the core mold and the cavity mold; and (d) a removal system including: a removal feature defining a plurality of part vacuum channels and a plurality of trim vacuum channels; and a conveyance mechanism for moving the removal feature from a third position in engagement with at least one of the core mold and the cavity mold to a fourth position. In an example, the mold plate includes a first mold area and at least one fluid inlet, and a wall substantially surrounding the first mold area, wherein the fluid channel is disposed adjacent to and surrounding the wall, and wherein the at least one fluid trim channel is fluidically connected to the at least one fluid inlet and defines a fluid channel outlet. In another example, the forming station further includes: a sealing ring secured to the mold plate and at least partially covering the at least one fluid trim channel outlet, wherein the sealing ring is spaced apart from the wall so as to at least partially define a fluid slot therebetween. In yet another example, the sealing ring is removably fixed to the mold plate. In still another example, the at least one fluid trim channel defines a maximum channel width and the fluid slot defines a maximum slot width less than the maximum channel width.

In another example of the above aspect, the fluid slot is disposed so as to direct a flow of fluid in a direction substantially orthogonal to an uppermost extent of the wall. In an example, the part transfer feature includes a part transfer mold compatible with the forming mold. In another example, the part transfer system conveyance mechanism includes a robotic arm. In yet another example, the part transfer system conveyance mechanism includes a shuttle disposed on a gantry. In still another example, the gantry extends in a first direction away from the forming mold and an opposite, second direction away from the forming mold.

In another example of the above aspect, both of the core mold and the cavity mold define the plurality of vacuum channels. In an example, the at least one heating element includes a plurality of heating elements, and wherein both of the core mold and the cavity mold include at least one of the plurality of heating elements. In another example, the removal feature includes a removal mold. In yet another example, the removal feature includes a plurality of vacuum cups. In yet another example, the removal system conveyance mechanism includes a robotic arm. In still another example, the removal system conveyance mechanism includes a shuttle disposed on a gantry.

In another example of the above aspect, the removal system is the part transfer system. In an example, the molded fiber part production line further including a print station, and wherein when in the fourth position, the removal feature is in engagement with the print station. In an example, the print station includes a registration feature. In another example, the print station includes at least one print device. In yet another example, the at least one print device includes at least one of a screen printer, a laser printer, an inkjet printer, and a pad printer. In still another example, the molded fiber part production line further including stacking station.

In another example of the above aspect, herein at least one of the part transfer system and the removal system includes at least one of a robotic arm, a shuttle, and a conveyor.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. For purposes of clarity, not every component may be labeled in every figure.

DETAILED DESCRIPTION

Figure 1:
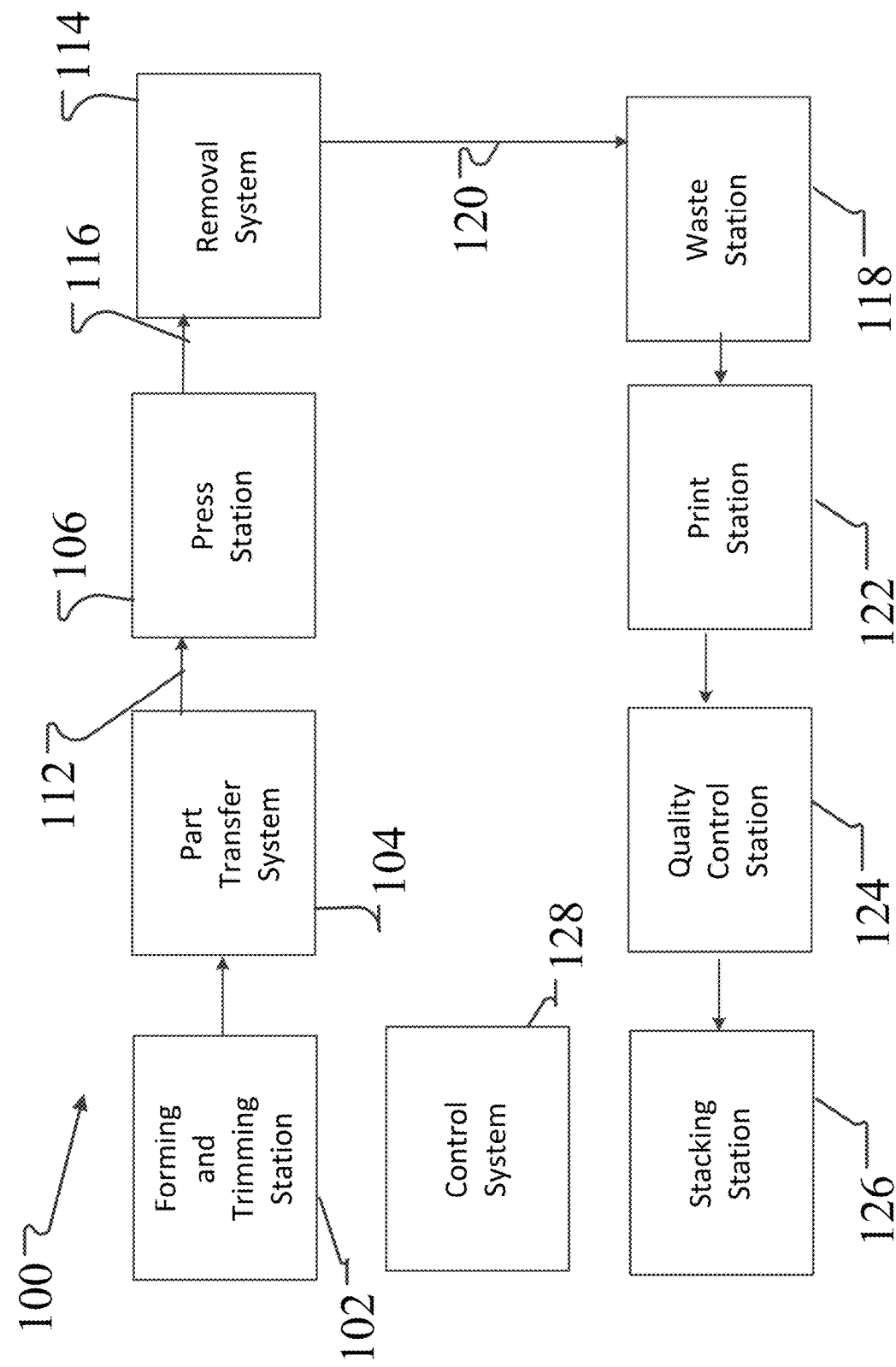
FIG. 1 depicts a schematic of an example molded fiber part production line.

Before the production lines for producing molded fiber products are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples of the production line and components thereof only and is not intended to be limiting. It must be noted that, as used in this specification, the singular forms "a," "an," and "the" include plural referents unless the context clearly dictates otherwise. Thus, for example, reference to "an operation" may include multiple operations, and reference to "producing" or "products" of an operation or action should not be taken to be all of the products.

Various examples of the technology described below relate to the manufacture of fiber-based or pulp-based products for use both within and outside of the food and beverage industry. By way of non-limiting example, the present disclosure relates to the automated, efficient, high-speed production of fiber-based containers. The fiber-based products are adapted to replace their plastic counterparts in a wide variety of applications such as, for example: frozen, refrigerated, and non-refrigerated foods; medical, pharmaceutical, and biological applications; microwavable food containers; beverages; comestible and non-comestible liquids; substances which liberate water, oil, and/or water vapor during storage, shipment, and preparation (e.g., cooking); horticultural applications including consumable and landscaping/gardening plants, flowers, herbs, shrubs, and trees; single-use or disposable storage and dispensing apparatuses (e.g., paint trays, food trays, brush handles, protective covers for shipping); produce (including human and animal foodstuffs such as fruits and vegetables); salads; prepared foods; packaging for meat, poultry, and fish; lids; cups; bottles; guides and separators for processing and displaying the foregoing; edge and corner pieces for packing, storing, and shipping electronics, mirrors, fine art, and other fragile components; buckets; tubes; industrial, automotive, marine, aerospace and military components such as gaskets, spacers, seals, cushions, and the like; and associated molds, wire mesh forms, recipes, processes, chemical formulae, tooling, slurry distribution, chemical monitoring, chemical infusion, and related systems, apparatus, methods, and techniques for manufacturing the foregoing components.

An existing production line for manufacturing molded fiber parts or products is described in Chinese Patent Application No. 201711129438.X (hereinafter, "the '438 application"), entitled "Flexible Production Line for Producing Pulp Molded Products," which is hereby incorporated by reference herein in its entirety. The '438 application describes generally a forming station that includes a former that creates a wet part by dipping a first mold into a tank of fiber slurry, drawing fiber onto the mold until a desired amount of fiber is collected on the screen, and then removing the mold with the attached fiber layer from the slurry. In the system described in the '438 application, the forming station also subjects the wet part to a forming operation in which the first mold with the attached layer of fiber is pressed into a second mold after it is removed from the slurry. This forming operation removes some water from the wet part and contours the surface of the wet part opposite the first mold. In the production line of the '438 application, after the molded fiber part is created by the forming station, it is then pressed in a pressing station. The pressing station may be a plurality of pressing stations, operating in parallel. In one example of the '438 application, four pressing stations are utilized. Each of the four pressing stations in the '438 application includes a single press. Parts are sent to a stacking station after pressing. The forming station, pressing stations, and stacking station are arranged in a circle around a centrally located robot controlling an extendable robotic arm. The robot and robotic arm are configured to remove formed parts from the forming station and transfer them to any one of the four pressing stations. The robotic arm is further configured to remove pressed parts from any the pressing stations and transfer them to either a different one of the pressing stations or to the stacking station. Although the application depicts a number of basic components and stations of a molded fiber part manufacturing line, it unfortunately displays a number of inefficiencies.

FIG. 1 depicts a schematic of an example molded fiber part production line 100. The line 100 is depicted having a number of stations and systems for moving partially-formed and formed parts between various stations of the line 100. The various stations and systems, as well as particular configurations of the line 100 itself, are described further herein. A combination forming and trimming station 102 includes a forming mold, a slurry tank, and an actuation system that moves the forming mold relative to the slurry tank (typically by lowering the mold into the slurry tank). The slurry tank includes a fiber slurry that includes wood fibers in a liquid. The forming and trimming mold itself includes a number of vacuum channels that are connected to a vacuum source, which are used during the forming process. The forming and trimming mold also includes a number of fluid channels defined therein, which are used for the fluid trimming processes described herein. The forming and trimming mold may have a number of discrete molds for making a plurality of identical fiber parts, although forming and trimming molds that are used to form different parts are also contemplated. In an example, the forming and trimming mold may include a mold body or plate that includes the required contours, features, etc., for a particular product. The vacuum channels of the mold body may have deliberate paths or layouts within the mold body, or may be formed randomly therein as part of the mold manufacturing process. Some mold bodies may include thereon a screen or mesh that forms the surface upon which the fibers are drawn during the forming process. In use, the actuation system lowers the forming mold into the slurry tank and the associated vacuum source is activated. This draws the slurry liquid into the vacuum channels, thereby leaving fibers disposed on the surface of the forming mold or the mesh, if present. When a desired amount of fibers are drawn onto the surface or mesh, the actuation system raises the forming mold from the slurry. At this point in the process the fibers disposed on the forming mold are referred to herein as a partially-molded fiber part, in that it includes the general contours and features of a finished molded fiber part, but does not display the performance characteristics of a finished part.

The partially-formed molded fiber part may then be partially compressed and trimmed of waste material. These operations may be performed, in part, by the forming and trimming station 102, in combination with a part transfer system 104. The part transfer system 104 includes a part transfer feature that may be a part transfer mold that substantially corresponds to or is compatible with the forming and trimming mold. In that regard, the part transfer mold also performs a function of forming surfaces of the partially-molded fiber part disposed opposite the surfaces of the partially-molded fiber part that contact the forming mold. During this partial forming operation, trimming operations such as described herein may also be performed by the forming and trimming station 102. The part transfer mold may also include or define a number of vacuum channels (as described above in the context of the forming mold) that are connected to a vacuum source. In use, the part transfer mold is positioned so as to contact the partially-formed molded fiber part. This contact forms the opposite surface of the partially-formed molded fiber part. Upon actuation of the vacuum source, the partially-formed molded fiber parts are removed from the forming mold. The part transfer system 104 includes a conveyance system that moves the part transfer mold from the forming station 102 to a downstream station, in this case, a press station 106. In that regard, the forming station 102 and the press station 106 may form the terminal ends of a range of motion of the part transfer system 104, which in examples may be referred to as a first position and a second position, respectively. Depending on the cycle time of the forming station 102 and the press station 106, the second position may be an intermediate wait station where the part transfer feature may be positioned to wait for the press station 106 to become available.

The production line 100 includes a press station 106 that utilizes a combination of compressive pressure and elevated temperature to substantially solidify the partially-formed molded fiber part into the molded fiber part (which meets the general performance requirements to be used). The part transfer system 104 may transfer the partially-formed fiber part to the press station 106 (as depicted by arrow 112). The discrete press station 106 includes two molds, referred to generally as a core mold and a corresponding and compatible cavity mold. Regardless of terminology used, the core mold and cavity mold form the two generally opposing surfaces of a formed fiber part. These two molds are generally similar in construction to the forming and trimming mold and transfer mold described above as required in order to form the partially-formed fiber part into the formed fiber part. However, as the trimming operations are performed at the forming and trimming mold, configurations that allow for trimming are not required in the molds used at the press station 106. The transfer 112 may occur by the part transfer feature of the part transfer system 104 substantially mating with either of the core mold or the cavity mold. Vacuum channels may be formed in either or both of the core mold and cavity mold and are connected to a dedicated vacuum source. The vacuum source for the mold in engagement with the transfer feature during transfer 112 may be activated so as to transfer the partially-molded fiber part to the appropriate mold of the press. Heating elements may be disposed in either or both of the core mold and cavity mold. The core mold and cavity mold are moved relative to each other by a press actuation system that in examples is a hydraulic press. As the press actuation system decreases the separation distance between the core mold and the cavity mold (with the partially-formed fiber part therebetween), the increased compressive pressure helps form the part into the molded fiber part. The increased compressive pressure squeezes additional liquid from the partially-formed fiber part, which may be removed from the press station by one of more vacuum sources connected to the vacuum channels present in either or both of the core mold and the cavity mold. Further, the elevated temperature generated by the heating elements helps to further form and dry the partially-formed fiber part until a part more consistent with the formed fiber part is produced therefrom.

A removal system 114 removes the molded fiber parts from the press station 106, for example, along path 116. The removal system may include a removal feature that includes a plurality of vacuum channels. The plurality of vacuum channels in the removal feature may be utilized to remove the part from the press station 106. The removal feature may be in the form of a removal mold configured to be compatible with the either of the core mold and the cavity mold. The vacuum channels, in that case, are in communication with one or more ports on the surface of the removal mold such that vacuum pressure may draw the formed fiber part off of the core mold or cavity mold. In another example, the removal feature may be a plurality of vacuum cups connected to the vacuum channels. Vacuum pressure applied to the channels by the vacuum source may also remove the formed fiber part from the core mold or the cavity mold. The removal system 114 includes a conveyance mechanism that moves the removal feature from the position in engagement with the particular mold of the press station to a downstream station, for example, along path 120. Downstream stations in this context may be one or more of a waste station 118, a print station 122, a quality control station 124, and a stacking station 126, each of which are described below. In generally, however, downstream stations include any station downstream from a particularly identified station, as upstream stations include any station upstream from a particularly identified station.

The waste station 118 may be utilized to dispose of obviously faulty or damaged molded fiber products, prior to further downstream processes. The waste station 118 may include a system for reintroducing damaged molded fiber products into the slurry system. In an example, the waste station may be a bin, chute, or other structure into which the damaged products may be released from the removal system 114. When the removal system 114 is appropriately positioned relative to the waste station 118, the vacuum source may be turned off or terminated, so that the faulty product may disengage from or otherwise fall from the removal feature. Appropriate positioning may correspond to physical engagement between the removal feature and the waste station 118, or the position of the removal feature may be detected relative to the waste station 118, via proximity, optical, or other sensors. Part vacuum pressure may be maintained through the waste station 118, such that acceptable molded fiber parts are not released into the waste station 118, but are instead delivered to stations farther downstream.

Subsequent to the waste station 118, the molded fiber part is considered generally sufficiently formed for use. However, other downstream stations may be utilized to add graphics, logos, or other visual information to each molded fiber part, check the quality of the finished parts, or stack or otherwise pack the molded fiber parts for delivery. As such, a downstream print station 122, a quality control station 124, and a stacking station 126 are depicted. These optional stations are described in further detail below.

The entire production line 100 may be automated and controlled by a control system 128 as shown. The control system 128 may be connected to, and control the operation of, each station and even subcomponents of each station, as well as the transfer and removal systems (in the form of conveyors, robots and other devices, as described elsewhere herein). As discussed further below, the control system 128 may monitor the operation and conditions on the production line 100 continuously and adjust operation to ensure proper functioning and quality of the final parts.

Control of all operational parameters is anticipated to improve the quality of the formed fiber parts and increase yield of the production line 100. To obtain such control, a sensor network throughout the production line 100 is contemplated. In an example, various sensors are provided at each station and on each conveyance system to monitor any pertinent parameter of the operation of the production line 100. The sensors that detect the presence of excess fiber to be trimmed from the partially-molded fiber parts at the forming and trimming station is one example of such monitoring; the temperature control of the heated molds of the press station is another. Signals from these and other sensors may be sent to and processed by the control system 128. As another example, the forming and trimming station or press station 106 may be dynamically controlled based on sensors in the respective stations 102, 106. In an example, a trimming operation may be performed by the forming and trimming station until the sensor associated therewith no longer detects the presence of trim requiring removal. In a more complex example, the press station 106 may be operated until a desired state in the formed fiber part is obtained. In an example, one of the molds in the press station 106 may be provided with one or more sensors that monitor, directly or indirectly, a state of the formed fiber part. For example, a temperature sensor on the surface of the mold could be provided to monitor a temperature of the formed part at a location where it contacts the mold. Similarly, a pressure sensor, a humidity sensor, a light emitter/sensor pair, a conductance sensor, an electrode or electrodes monitoring the flow of current through the formed part, or any other such monitoring device or devices could be provided at one or more locations on the mold. Based on the output of the sensors, the time allotted to press the formed part could be dynamically controlled by the control system 128. For example, upon reaching a desired temperature (e.g., a predetermined temperature threshold) as determined by a temperature sensor, the pressing operation may be terminated.

Such monitoring sensors are not limited to being located in or on the forming and trimming station 102 or press station 106 and could be located at any place in the production line 100. In one example, white water flow associated with the forming and trimming station 102 could be monitored via one or more flow sensors. This allows the flowrate and quantity of white water removed from the partially-formed fiber part to be monitored over time throughout the various stations of the entire production line 100. This allows, e.g., the press station, to be controlled based on the quantity and flow rate of water observed during the operation. Upon determining that the water flow rate or quantity have reached a predetermined threshold (e.g., the flow rate has dropped by 90% since the start of the operation, or after collecting 10 ml of water from the part during a pressing operation), the pressing operation may be terminated regardless of how long the operation has been performed.

Such monitoring data could also be used to do more than simply control how long the press station 106 or any other component operates. In an example, the press station 106 could increase or decrease pressure dynamically based on the data collected. In this way, it is contemplated that any controlled operational parameter (e.g., press operation time, press pressure, mold temperature, slurry temperature, vacuum pressure, slurry flow rate, slurry quality, mix tank temperature, conveyor speed or temperature, dryer temperature, ink flow rate, or any other operational setting related to time, temperature, pressure, or movement of a component of the production line) could be controlled in response to data obtained from the one or more sensors.

The production line 100 in FIG. 1 may be operated in a continuous mode. The various stations and part transfer systems may be continuously moving and parts on the production line 100 are formed, trimmed, pressed, printed, and dried while in motion. For example, in an example the quality control station may be a simple pass through station through which a conveyor passes while the parts are tested, as described herein. The printing station may be one or more movable or fixed print heads that print onto the part as the part passes under the print heads.

Other configurations are also possible. For example, a semi-continuous configuration could be provided in which one or more of the stations removes the part from the production line 100 for some period of time and then replaces it when a subsequent station's operation is complete. In a different semi-continuous configuration, the part transfer system 104 may operate in a stop-start mode in which, on a prescribed schedule, the part transfer system 104 moves a predetermined distance and stops. In this way, each part is moved between stations over time. In an example, one or more of the part transfer system 104 and removal system 114 may have part transfer features in the form of molds, such as core molds as described herein, incorporated into the appropriate system 102, 114. The molds may provide positive retention of the parts during movement thereof. The press stations could then have the outside mold which receives the part when it reaches the station.

The production line 100 in FIG. 1 has several advantages. It has inherent expandability in that multiple parallel press stations 106 and waste stations 118 may be operated simultaneously, with a part transfer system 104 and a removal system 114 serving the various stations. In such parallel configurations, each of the parallel portions may be referred to as "sub-lines." In another example, each of the parallel sub-lines may be dedicated to a different customer having different printing requirements, finished part requirements (thus different pressing and/or drying requirements). Further, as another example, multiple stacking stations 126 would allow for the different customer parts to be stacked separately in an easily automated fashion. The parallel configuration of multiple sub-lines adds resilience to the production line 100 in that any one station in the sub-lines could fail without bringing the entire production line 100 to a stop. Further resilience could be provided by including a second forming station 102. At any given time, different sub-lines may be taken out of operation without affecting the operation of the other sub-lines. Thus, a sub-line dedicated to a specific product may be inoperative until that product is needed, meaning that retooling time can be eliminated.

Figure 2:
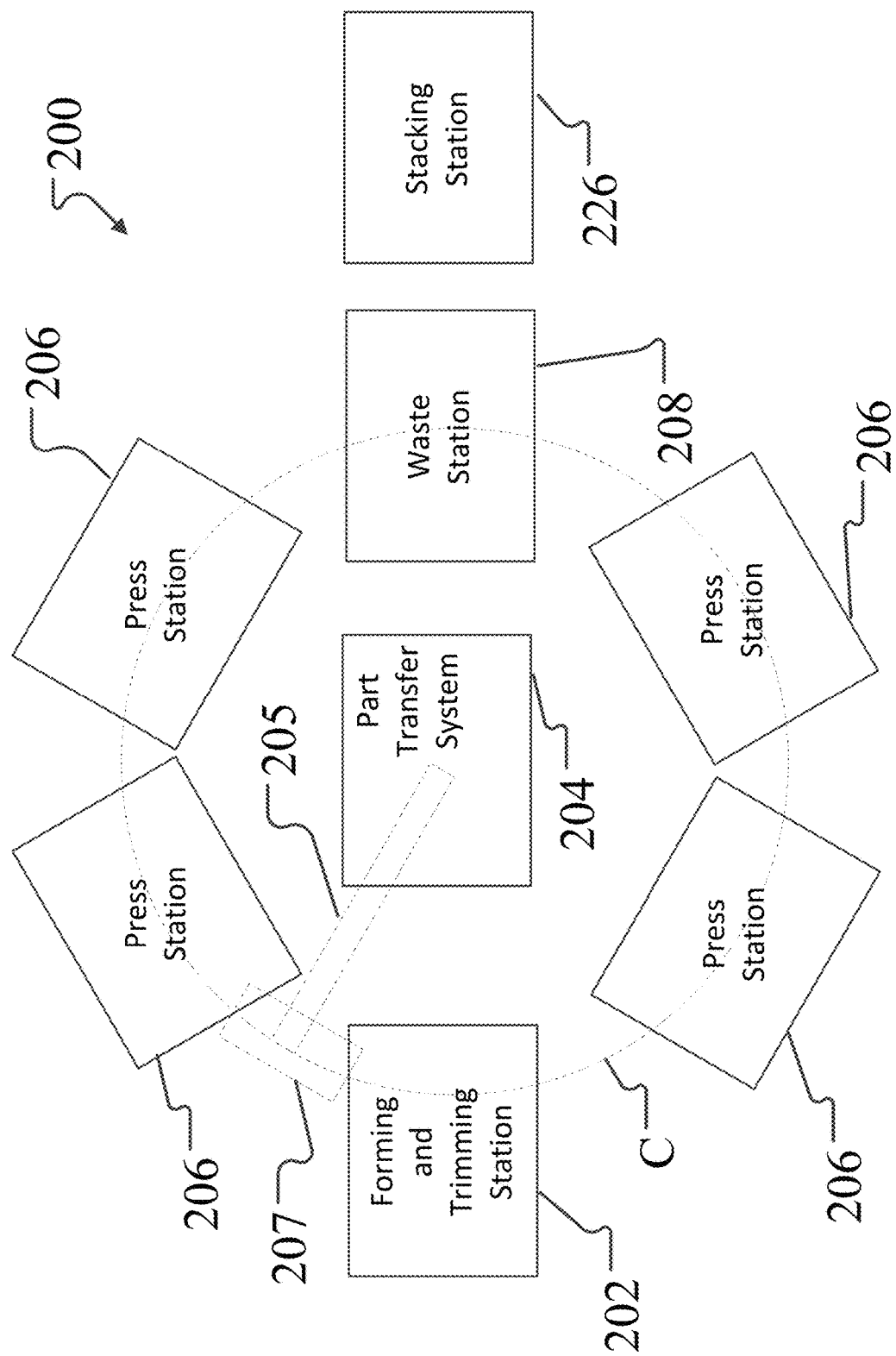
FIG. 2 depicts an example of the production line of FIG. 1, in a circular layout configuration.

FIG. 2 illustrates another example of a production line 200. A number of components and features thereof are described above with regard to FIG. 1 and, as such, are not described further. In this production line 200, the various stations are disposed in a circular configuration about a central part transfer system 204. Here, the part transfer system 204 includes an articulating robotic arm 205 that has a maximum rotational range of motion generally corresponding to the depicted circle C. The part transfer system 204 moves a transfer feature 207 (in this case, a part transfer mold) disposed at an end of the robotic arm 205 from the forming and trimming station 202 to one of the four press stations 206. Movement in this example would generally include removing the transfer feature 207 from the forming and trimming station 202 (e.g., by retracting the robotic arm 205, rotating the robotic arm 205 so as to align the transfer feature with an access area (the area generally facing the part transfer feature 204) of a press station 206, then extending the robotic arm 205 so as to insert the transfer feature 207 into the press station 206. During this movement, the part transfer system 204 also moves the partially-formed fiber parts disposed on the part transfer feature 207. Once the formed fiber parts are pressed, the part transfer system 204 moves those parts (again disposed on the transfer feature 207) from the press station 206 to a waste station 208, where visibly damaged or faulty products may be discarded, in a generally similar movement pattern. In this example, then, the part transfer system 204 also acts as the removal system, as described above in the context of FIG. 1. Subsequent to depositing unacceptable product at the waste station, the acceptable formed fiber parts may be transferred to one or more downstream stations, though only a stacking station 226 is depicted. A different transfer system from the waste station 208 to the stacking station 226 may be required. For example, the stacking system 226 may include dedicated arms or other features that remove the formed fiber parts from the part transfer system 204 and stack them directly at the stacking station 226. This enables acceptable formed fiber parts to be moved past the waste station 208 to the stacking station 226. This may be performed by one or more of a conveyor, a second robotic arm, a servo shuttle, or a ramp.

Figure 3:
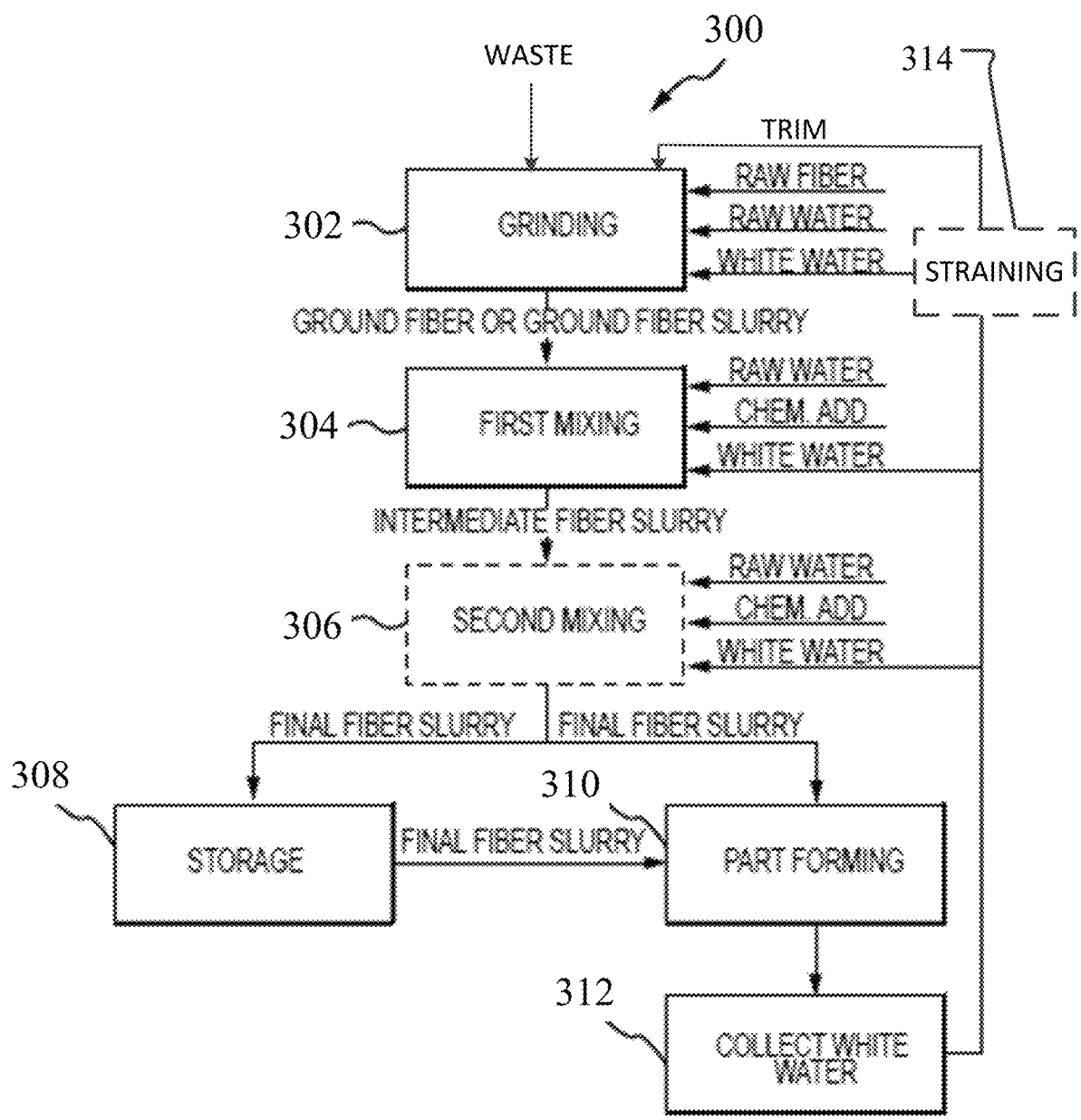
FIG. 3 illustrates an example of a method for fiber slurry production.

FIG. 3 illustrates an example of a method for fiber slurry production. Sometimes referred to as "wet prep" or "stock prep", the slurry production line 300 creates the fiber slurry from the raw materials. Typical raw materials are wood or plant fiber, typically provided in rolls or sheets; and water. In addition to raw materials, faulty, damaged, or otherwise unacceptable product from the waste station described above may be introduced with the raw materials. In some instances chemical additives may also be used to enhance or modify characteristics of the final fiber product (e.g., resistance to grease penetration, water adsorption rate, porosity, density, etc.). In the example shown, incoming raw dry fiber is passed to a grinder and shredded to a predetermined size in a grinding operation 302. Sometimes also referred to as a pulper or hydropulper, the grinder may be any conventional grinder. Fiber grinding is known in the art and any conventional system or method, now known or later developed could be used. In an example, the fiber is mixed with at least some water as part of the grinding operation 302 and the output product is a liquid stream containing a mixture of ground fiber and water. This improves the grinding efficiency and reduces the generation of fiber dust from the operation.

In an example, the grinding may be done in multiple stages. For example, a first grinder may perform a coarse grind and pass the coarsely ground fiber slurry to a second, fine grinder that generates the final grind and outputs the ground fiber slurry. After the grinding, the ground fiber and water mixture is passed to a first mix tank where a first mixing operation 304 is performed. In the first mixing operation 304, additional water is added, if needed. If the final fiber part to be created needs specific characteristics, chemical additives also may be added in the first mixing operation 304. As part of the first mixing operation 304, the quality of the slurry may be monitored, periodically or continuously. The addition of water, any additives, and temperature may be controlled in response to the information obtained from the monitoring. In an example, the monitoring may include use of one or more sensors such as temperature sensors, water quality sensors such as hydrometers, total dissolved solids (TDS) sensors, pH meters, densimeters, dissolved oxygen sensors, salinity meters, resistivity meters, conductivity meters, etc. Many water quality sensors are known in the art and any such monitoring device, now known or later developed may be used to monitor the quality of the slurry in this, or any operation in the slurry production method 300.

After the first mixing operation 304, an optional second mixing operation 306 may be performed. In this example, the first mixing operation 304 may be considered a pre-mixing or preparation operation that is controlled to get the slurry to within a certain range of slurry quality. The second mixing operation 306 is then used to adjust the slurry characteristics to a finer quality range. For example, in the first mixing operation 304 the slurry may be controlled to +/−10% of a desired nominal slurry quality (e.g., if the desired slurry is a 10% by weight fiber slurry, then the fix mix tank is controlled to maintain the slurry within 9.0 to 11.0% by weight fiber. The second mixing operation 306 may then be designed to maintain the slurry within a +/−1% of nominal range). The +/−10% and +/−1% ranges of the two operations 304, 306 are simply examples and any suitable ranges may be used. For example, the first mixing operation 304 may maintain the slurry at +/−0.5% of nominal, +/−1.0%, +/−1.5%, +/−2.0%, +/−2.5%, +/−3.0%, +/−3.5%, +/−4%, +/−4.5%, +/−5.0%, +/−7.5%, +/−10.0%, +/−15.0%, +/−20.0% and the second mixing operation 306 may maintain the slurry at any smaller range around the nominal, such as, +/−0.01%, +/−0.05%, +/−0.1%, +/−0.2%, +/−0.25%, +/−0.30%, +/−0.035%, +/−0.4%, +/−0.45%, +/−0.5%, +/−0.55%, +/−0.6%, +/−0.75%, +/−1.0%, +/−2.0%, +/−5.0%, or greater.

In an example of the second mixing operation 306, the intermediate slurry from the first mixing operation 304 is analyzed and a stream is passed through an intermediate mixer where the addition of water and chemical additives, if any, is finely controlled to achieve a slurry quality within the finer range. The intermediate mixer may be a mixing tank or a plug flow reactor or a combination thereof. The second mixing operation 306 may be a batch, semi-batch or continuous operation. The second mixing operation 306 outputs a stream of final fiber slurry that may then be stored in a storage tank in a storage operation 308 until use or passed directly to the forming station for use as described above in creating a formed part in a forming operation 310. As part of the forming operation 310 water is reclaimed from the slurry as the slurry is passed through the mesh on the forming mold. The reclaimed water is referred to as "white water". This white water may be reused in the slurry production method 300 by collecting the white water in a collection operation 312. The white water may include the trim obtained from the combination forming and trimming station described above and elsewhere herein, which is typically of a moisture content to not cause undesirable clumping of the trim in the white water, thus allowing it to be reintroduced without further processing. In other examples, however, the trim may be strained from or otherwise removed from the white water (at a straining operation 314) and reintroduced, e.g., at the grinding operation 302. The white water may then be returned and used as feed water in any of the grinding operation 302, first mixing operation 304 and/or second mixing operation 306.

In an example, the water used in the fiber slurry production method 300 is pretreated to remove any unwanted organic or inorganic compounds. For example, in an example the water may be filtered to reduce salt or total dissolved solids (TDS) concentration. The closed loop formed by the collection operation 312 and returning white water to the slurry as feed water is especially economical if the raw water must undergo pretreatment before use in the slurry production method 300. In an example, the water and various intermediate and final slurries created in the fiber slurry production method 300 are heated to maintain them at a desired temperature. In an alternate example, the final fiber slurry is heated as a last operation (not shown) prior to being transferred to the forming station. For example, in an example the ground fiber slurry, the intermediate fiber slurry and the final fiber slurry are all maintained within a predetermined temperature range. That is, the temperature of the water and slurry throughout the production process are temperature controlled. The temperature range may be from 90° F. and 200° F. or from 100° F. and 150° F. In one example, the predetermined temperature range is +/−5° F.

around a nominal temperature selected from 90° F., 95° F., 100° F., 105° F., 110° F., 115° F., 120° F., 125° F., 130° F., 135° F., and 140° F.

Figure 4:
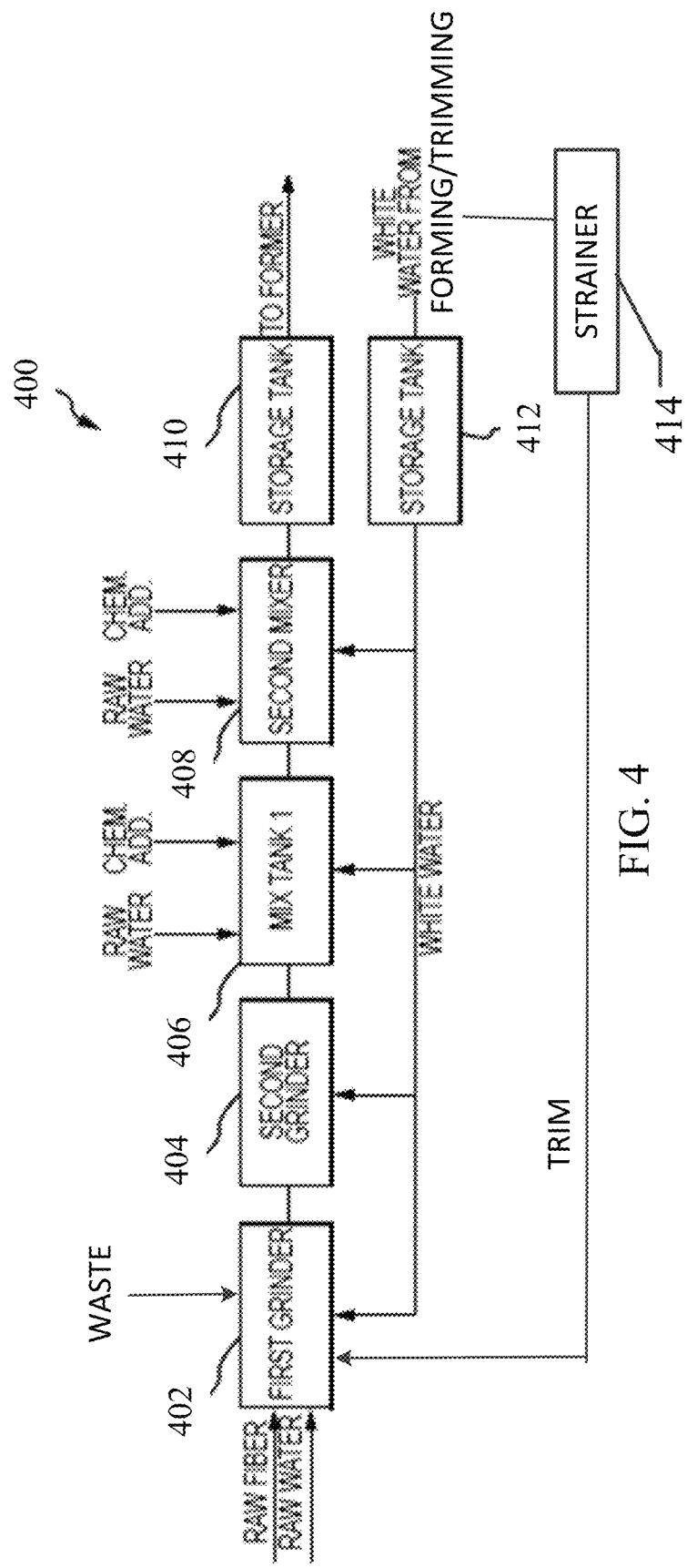
FIG. 4 is a schematic of a slurry production line that performs the method of FIG. 3.

FIG. 4 is a schematic of a slurry production line 400 that performs the method of FIG. 3. In the schematic, a first grinder 402 and a second grinder 404 are followed by a first mix tank 406. The grinders 402, 404 are described above. The first mix tank 406 may be open or closed, exposed to the atmosphere, or atmosphere controlled. The slurry may be agitated while in the mix tank 406. Any means of agitation may be used such as a mechanical agitator (e.g., bladed stirrer, paddle, or rotating screw), removing and reinjecting slurry to circulate the contents of the tank, or by sparging a gas (e.g., heated or ambient temperature air, nitrogen, argon, or other inert gas) through the slurry in the tank. The tank 406 may be temperature controlled by any suitable means as are known in the art (e.g., heated jacket, internal heating element, heated slipstream, infrared radiation, etc.). Temperature sensors may be provided to continuously monitor the temperature of the tank 406.

A second mixer 408 is provided that performs the second mixing operation 306. As discussed above, the second mixer 408 need not be a tank and could be a plug flow reactor (e.g., a section of pipe with injection points for water and chemical additives and sensors to monitor the quality of the slurry). Or it could be a second mix tank 408 similar to the first mix tank 406. A storage tank 410 is provided in the slurry production line 400 for buffering final fiber slurry before transferring it to the forming and trimming station (depicted elsewhere herein). The slurry production line 400 also includes the white water return from the forming and trimming station, as shown. A second storage tank 412 is provided for buffering white water until the water is needed in the earlier operations of the slurry production line 400. Trim from the forming and trimming station may be removed from the white water at a strainer 414 and may be reintroduced separately, e.g., at the first grinder 402, although trim may also be introduced to the second grinder 404. Alternatively, trim may be introduced as a constituent of the white water. In an example, the slurry production line 400 forms a closed loop requiring little or no makeup water after initial startup.

The schematic of FIG. 4 does not include the standard plumbing fixtures and appliances normally attendant in such an operation, such as flow control valves between each component, relief valves, bypass valves, sampling ports, pumps where necessary to move slurry between components, a conveyor or similar feeder for delivering raw fiber to the grinder, sensors, and the like. The reader will understand that such fixtures and appliances are anticipated and considered part of the production line 400 but, for clarity, are not represented in FIG. 4. For example, in an example there is a pump between each component in the production line 400.

The slurry production line 400 may be configured for batch, semi-batch or continuous operation. In continuous operation, one or more components may store sufficient fiber slurry to act as a flow buffer to allow for switching out of fiber sources or periodic (automated or manual) fiber grinding operations. For example, in an example, the first mixing tank 404 is sized to hold a sufficient volume of slurry for eight hours of continuous operation of the fiber product production line 400 at full operation. In this way, every few hours a new batch of ground fiber slurry may be generated (either automatically or manually) and added to the first mix tank 406. The second mix tank or mixer 408 may be significantly smaller or a simple pass through that continuously feeds final fiber slurry to the forming station. In an example, except for reloading raw fiber input materials and maintenance activities the slurry production line 400 may be fully automated and control from a central control system. In yet another example, even the raw fiber input handling is automated using autonomous robots for moving and installing the raw fiber input onto the feeding system (e.g., inserting new rolls of raw fiber sheet into a roll feeding apparatus or placing bales of fiber sheets in a feed hopper).

Figure 5:
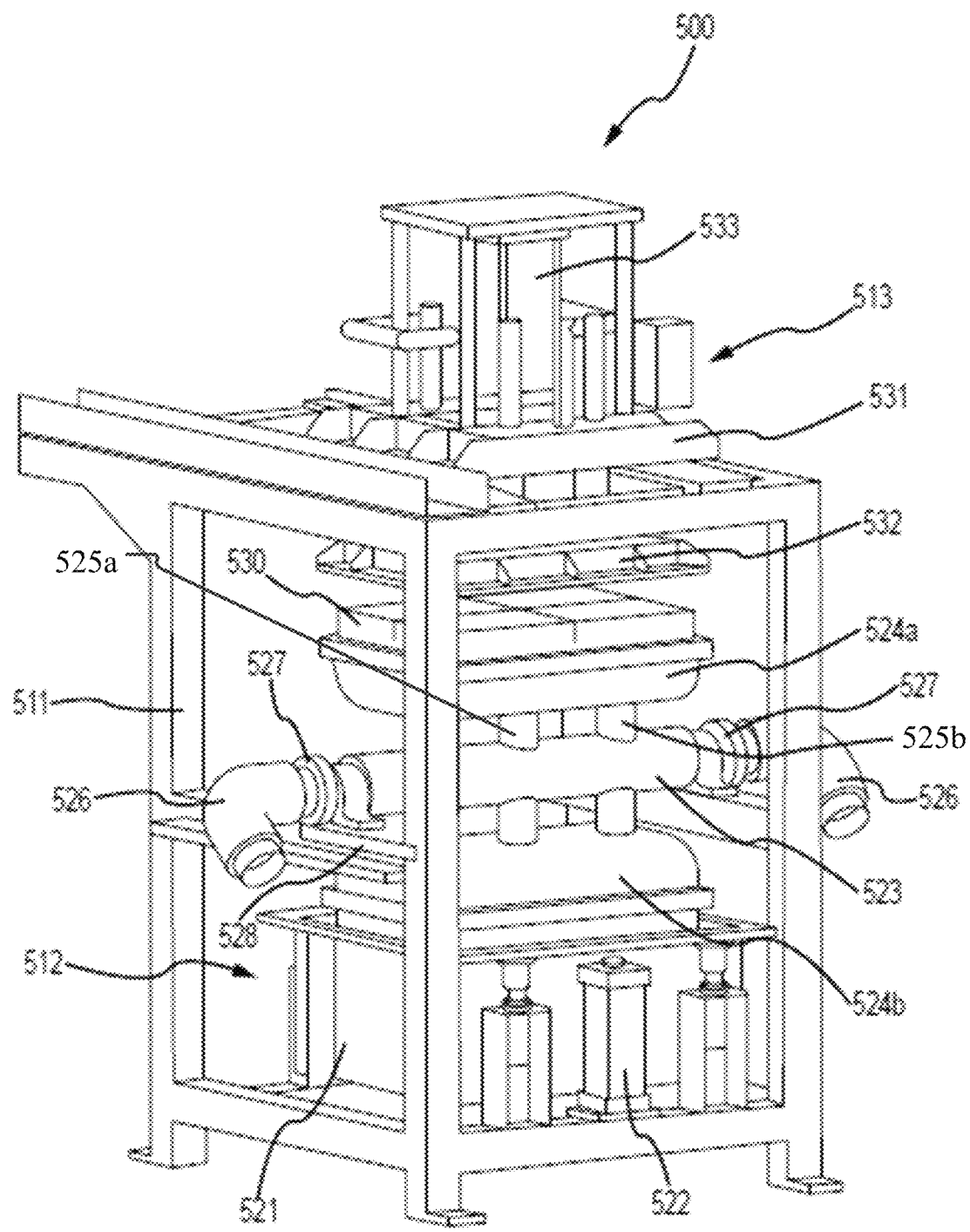
FIG. 5 depicts an example of a forming and trimming station.

FIG. 5 depicts an example of a forming and trimming station 500. Specifically, as shown in FIG. 5, the forming and trimming station 500 includes a frame 511 on which a lower portion 512 and an upper portion 513 are provided. The upper portion 513 includes a shuttle 531 (corresponding in this case to the part transfer system described above) having an actuation mechanism 533 that allows for raising and lowering of a transfer feature, in this case, a transfer mold 532. A dedicated vacuum source fixed to the shuttle 531 is not visible in the figure. A cylindrical rotating shaft 523 is rotatably connected to the middle of the frame 511 between the lower portion 512 and the upper portion 513 via a rack mount 528. The shaft 523 has a rotation angle of less than 360° and the cylindrical rotating shaft 523 rotates back and forth. At both ends of the cylindrical rotating shaft 523 is an elbow 526. The two ends of the rotating shaft 523 are fixed on the frame by the rotating shaft seat, and the gears 527 are respectively sleeved on both ends of the cylindrical rotating shaft 523, and the two sides of the middle portion of the frame 511 are provided with a translational connection with the gears 527. Attached to the cylindrical rotating shaft 523 are two opposing, symmetrical forming molds 524a, 524b. In this example, the two molds 524a, 524b include mold plates 530 (only visible on the upper portion 513) having core molds formed thereon and provided with screens onto which the fiber is drawn when the molds are in the lower forming chamber 521, or slurry tank. In FIG. 5, the lower mold 524b is in the slurry tank 521, referred to as the forming position, and the oppositely located upper mold 524a is facing upwards towards the shuttle 531 and the transfer mold (a cavity mold) 532 carried thereon.

The two core molds 524a, 524b are rigidly connected to the rotating shaft 523 by several tubes 525a, 525b. Tube 525a is connected to a conduit within the hollow shaft 523 that is connected to a fluid source (not shown) for the trimming operations described herein. Tube 525b is connected to a conduit within the hollow shaft 523 that is connected to a vacuum pump system. The tubes 525a, 525b are further connected to the penetrations in the molds 524a, 524b, as described in more detail below. The vacuum pump system creates the pressure differential that pulls the slurry towards the mold 524, thus causing the fiber to build up on the screened surface of the mold. As mentioned above, the two core molds 524a, 524b are symmetrical. This allows them to be rotated about the axis of rotating shaft 523 by rotating the shaft 523, thus quickly moving the molds between the lower portion 512 and an upper portion 513. The fiber slurry bath is contained in the slurry tank 521. When a mold 524 is in that tank 521 as illustrated in FIG. 5, the fiber is deposited on the mold 524 as the slurry is drawn through the mold 524 by the vacuum pump system, thus creating the partially-formed fiber part (not shown) on the mold 524. In one example of the forming and trimming station 500, after the appropriate amount of fiber is drawn onto the mold 524 to the desired thickness, the slurry tank 521 is lowered from the mold 524 by an actuation system in the form of a vertical lift 522, freeing the mold 524 to be moved to the upper portion 513 position. The mold 524 and partially-formed fiber part can then be rotated to the upper portion 513 position. The upper portion 513 includes transfer mold 532 attached to the actuation mechanism 533. Activating the mechanism 533 causes the transfer mold 532 to press against the upward-facing lower mold 524a. The mechanism 533 may include one or more of a hydraulic cylinder, a servomotor, a gas cylinder or any other known lifting device. By pressing the mold 524 and mold 532 together, water may be driven out of the partially-formed fiber part and collected through the inner mold 524 via the shaft 523. Substantially simultaneously with this pressing operation, pressurized fluid for the trimming operation may be delivered via tube 525a to the mold 524, trimming excess material that may be squeezed out from the mold 524 during the pressing operation. The trimming operation is utilized to remove rough edges of the partially-molded fiber product that exist as the result of formation and pressing. By way of context, as the molded fiber products are formed, the significant pressures used may cause the molded fiber to flow and be expelled from the molds. This expelled fiber material should be removed for aesthetic, performance, design tolerance, and other purposes. The trim operation performed substantially simultaneously with the pressing operation during forming uses a jet of pressurized water or other fluid (e.g., white water, compressed air, etc.) to improve production times and reduce waste.

Upon completion of the forming and trimming operation, a suction is applied to the partially-formed fiber part through penetrations in the mold 532, and the mold 532 is retracted by the mechanism 533 onto the shuttle 531 for movement to a downstream station. This frees the mold 524 to be rotated to the lower portion 512 for the entire forming process to be repeated. In an example, the forming and trimming operation performed by the transfer mold 532 is operated at a selected pressure for a fixed period of time that is equal to the time that is taken for the formed part to be drawn onto the mold at the lower portion 512. In an alternative example described in greater detail below, the pressing time is dynamically controlled based on monitoring data from sensors at one or more locations on the upper portion 513. In an alternate example of the forming and trimming station 500, the slurry tank 521 may also include a movable outer mold (not shown) in the tank 521. In this example, after the fibers from the slurry are drawn onto the mold 524, this outer mold may be pressed against the mold 524 while in the slurry tank 521. This provides an additional pressing operation to the partially-formed fiber part, so that the parts exiting the former 500 will have been subjected to two pressing operations instead of just one as with the previous example. Regardless, after the partially-formed fiber part is created and removed from the inner mold 524 by the transfer mold 532, the shuttle 531 transfers it to another station in production line. In another example, the transfer mold 532 may be located at the end of a robotic arm that extends into the upper portion 513 and receives the part when the transfer mold's 532 suction on the partially-formed fiber part is activated. This is but one example of how the transfer of parts via the robotic arm may be effected. Many such methods and systems are known in the art and any suitable method and mechanism may be used in the forming station 500, the robotic arm or any other component of the production lines described herein.

Figure 6:
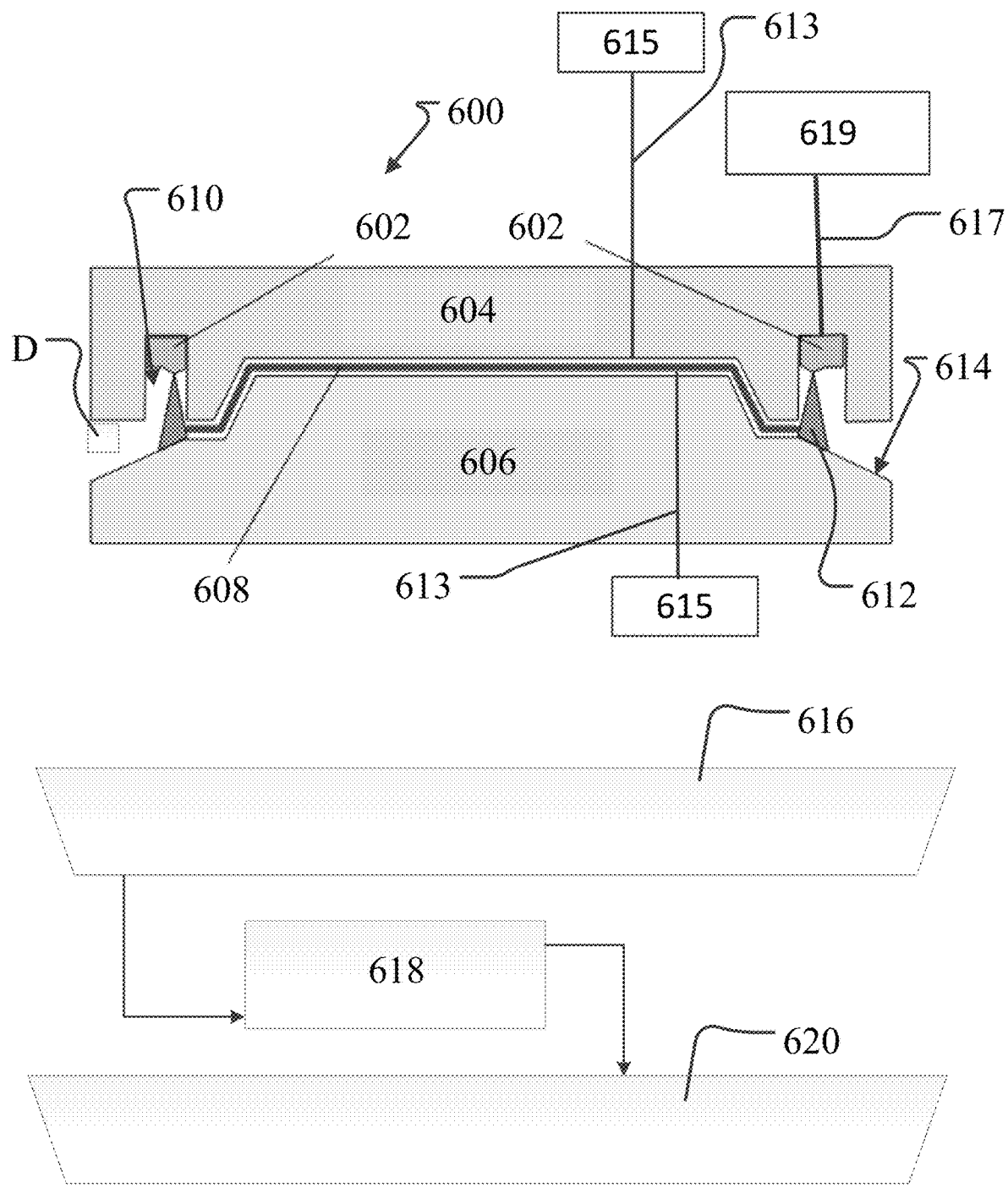
FIG. 6 depicts a partial schematic view of a forming and trimming station having a fluid capture system.

FIG. 6 depicts a forming and trimming station 600 having a first forming mold 604 and part transfer system 606 in mating engagement. The forming and trimming station 600 includes a first forming mold 604, in this case in a cavity mold configuration. As used herein, the term "cavity mold" means a mold having features that substantially project inward into the mold plate so as to form a "cavity" into which the fiber part 608 and core mold extend. The part transfer system 606 includes a part transfer feature, in this case, in the form of a part transfer mold having a core mold configuration. As used herein, the term "core mold" means a mold having features that substantially project away from the mold plate so as to form a "core" about which the fiber part 608 is at least partially surrounded. Each of the forming mold 604 and the part transfer mold 606 define at least one (but usually a plurality) of vacuum channels 613. The vacuum channels 613 are each connected to a dedicated vacuum source 615, the function of which is described above. After drawing fiber onto the first forming mold 604 by application of vacuum through the vacuum channels 613, the part transfer system 606 is placed in mating contact with the first forming mold 604. This mating contact applies slight pressure to the partially-formed molded part, squeezing liquid therefrom, which may be captured by the vacuum source 615. As such, the part transfer feature 606 may also be referred to as a "second forming mold," though it also performs the function of transferring the partially-formed fiber part one or more stations downstream of the forming and trimming station 600.

In the depicted example, the wet trim feature is a fluid spray ring 602 integrated with the upper forming mold 604. The upper forming mold 604 is shaped to mate with the lower forming mold, e.g., of the part transfer system 606, so as to form a formed fiber part 608 therebetween. The fluid spray ring 602 substantially surrounds the portion of the upper forming mold 604 that forms the outer limits of the formed fiber part 608. The fluid spray ring 602 may be a curved pipe or other conduit manufactured discrete from the material of the upper forming mold 604 and secured thereto. The pipe that forms the fluid spray ring 602 may be recessed substantially within a channel 610 formed in the upper forming mold 604 that prevents excess expelled fiber (referred to in some examples as "deckle") from potentially clogging the fluid outlets in the fluid spray ring 602, prevents the fluid spray ring 602 from being inadvertently damaged, and raises the fluid spray ring 602 above the submersion level of the upper forming mold 604 (again, so as to prevent clogging of the fluid outlets). The channel 610 may also act as a guide for the fluid spray 612 that is discharged from the fluid spray ring 602. In other examples, the outlets themselves may guide and direct the fluid spray 612, although it is to be appreciated that direction of fluid flow may be directed and/or controlled in any appropriate manner including dynamic direction/orientation/configuration. In examples, a fluid spray 612 discharge in the form of a linear or fan configuration is desirable, as it can be accurately directed to target specific locations of the forming and trimming station 600. Water, white water, or other fluid or liquid for performing the trim operation may be delivered to the fluid spray ring 602 via one or more channels 617 connected to a fluid source 619, which may be a pressurized reservoir, pump, compressor, or other component.

Further functionality may be incorporated into the forming and trimming station 600 so as to control the output of the fluid spray ring 612. For example, the fluid spray ring 612 may incorporate a plurality of spaced apart nozzles, each of which may be individually controlled so as to direct fluid only if required or desired. For example, only the nozzles disposed proximate a detected portion of excess expelled fiber may be activated, thus reducing the amount of fluid spray utilized. A detector D may utilize image recognition or other technologies to detect excess expelled fiber to be removed. Certain nozzles may only be activated for certain mold or products or processes. The fluid spray 612 may also be operated for a fixed time, or until the detector D or sensor indicates that the targeted deckle has been dislodged. Additionally, the fluid pressure, direction of the fluid spray, and/or spray pattern configuration may be individually controlled. In an example, higher pressures may be directed at deckle expelled from "thicker" products that are made with a mold that is used for both thick and thin products.

In examples, the fluid spray 612 is directed substantially vertically (in the context of the configuration depicted in FIG. 6) so as to limit the likelihood that fluid may infiltrate the space between the upper mold 604 and lower mold 606, which could result in damage to the partially-formed fiber part 608. To further reduce this possibility, an outer portion 614 of the lower mold 606 may be disposed at an angle so as to aid in shedding of the fluid spray 612 therefrom. In examples, the outer portion 614 may be disposed substantially orthogonal to the horizontal, at about 80° to the horizontal, at about 75°, 70°, 65°, 60°, 55°, or about 50° to the horizontal. In other examples, the outer portion 614 may be substantially curved to smoothly redirect the fluid spray 612 away from the mold 606.

In operation, as the upper forming mold 604 and lower forming mold 606 are pressed together, some of the fiber slurry may escape from the forming station 600 via the outer edges thereof. As such, the fluid spray 612 is ejected from the liquid spray ring 602 so as to remove that escaped slurry from the forming station 600. Due to the precise discharge pattern of the fluid spray 612, only the escaped portion of fiber slurry is removed therefrom, leaving a clean edge of the partially-molded fiber part 608 intact. The fluid spray 612 and material removed as part of the wet trim operation may fall into a catchment 616 that may be disposed below the lower forming mold 606. This mix of material may be processed via one or more processes (depicted generally at element 618 and described above in the context of FIGS. 3 and 4). In other examples, the mix of material may be simply reintroduced to a slurry tank 620 into which the upper forming mold 604 is introduced to begin the forming process. Thus, the fluid trim operation depicted and described includes yet another advantage, in that a wetter (relative to trim operation performed after downstream pressing operations) slurry material may be removed from the former. A wetter material is more easily reintroduced to the slurry, as compared to a dryer material removed near the end of the manufacturing process. This reduces or even entirely eliminates waste generated further downstream in the manufacturing process. In another example, the fluid spray 612 may be ejected so as to trim the part prior to the forming operation (e.g., prior to the upper forming mold 604 and the lower forming mold 606 being pressed together), but it may be difficult to maintain a clean edge of the formed part 608 in such an example. In examples, the fluid spray 612 may be ejected at pressures from about 20 psi to about 120 psi. In general, standard potable water pressure available from municipalities to typical commercial facilities, without further pressurization, may be utilized. Such pressures that may be utilized include about 20 psi, about 30 psi, about 40 psi, about 50 psi, about 60 psi, about 70 psi, about 80 psi, about 90 psi, about 100 psi, about 110 psi, and about 120 psi are contemplated. Further pressurization may be utilized, if desired, for example, with a supplemental fluid pump. In other examples, the fluid spray may be ejected from an outlet disposed on the part transfer system 606.

In order to obtain a desirable edge (e.g., by utilizing the precision fluid trim systems and operations described herein), it may also be advantageous to draw a greater amount of slurry on certain portions of the forming mold. For example, drawing a larger amount of slurry proximate the outer edge of the forming mold may be desirable. This may help ensure that the slurry spreads evenly as the forming operation is performed, so as to escape the forming mold around the entire perimeter thereof to be trimmed by the forming and trimming station depicted herein.

Figure 7:
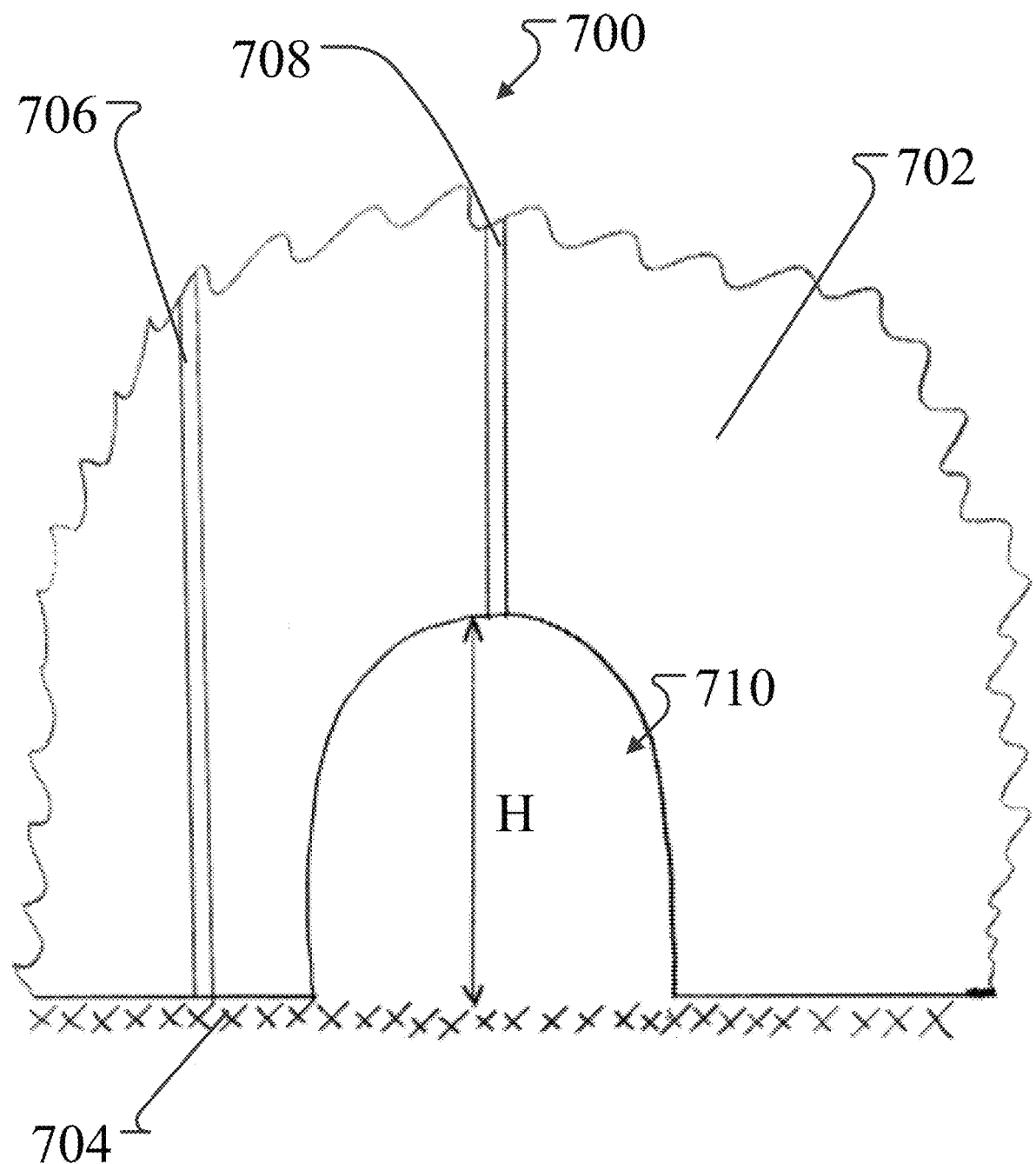
FIG. 7 depicts an enlarged sectional view of a portion of a mold of a forming and trimming station.

FIG. 7 depicts an enlarged section view of an upper forming mold 700 of a forming and trimming station. The upper forming mold 700 includes an underlying structural support 702 overlaid by a mesh 704, as described elsewhere herein. Both the structural support 702 and mesh 704 define the desired form of the molded fiber product. The structural support 702 defines a number of vacuum conduits 706, 708 distributed therein. During forming operations, the upper forming mold 700 is lowered into a slurry tank (not shown) and a vacuum applied to the various conduits so as to draw slurry onto the mesh 704. By locating an enlarged void or channel 710 below portions of the mesh 704, a greater amount of slurry may be drawn into that particular portion of the mesh 704. In the depicted example, the void or channel may have a height H of about 5 mm, about 10 mm, about 15 mm, or about 20 mm. A plurality of vacuum conduits 708 may be distributed along the top of the channel 710, e.g., about 5 mm, about 10 mm, about 15 mm, or about 20 mm on-center.

Figure 8:
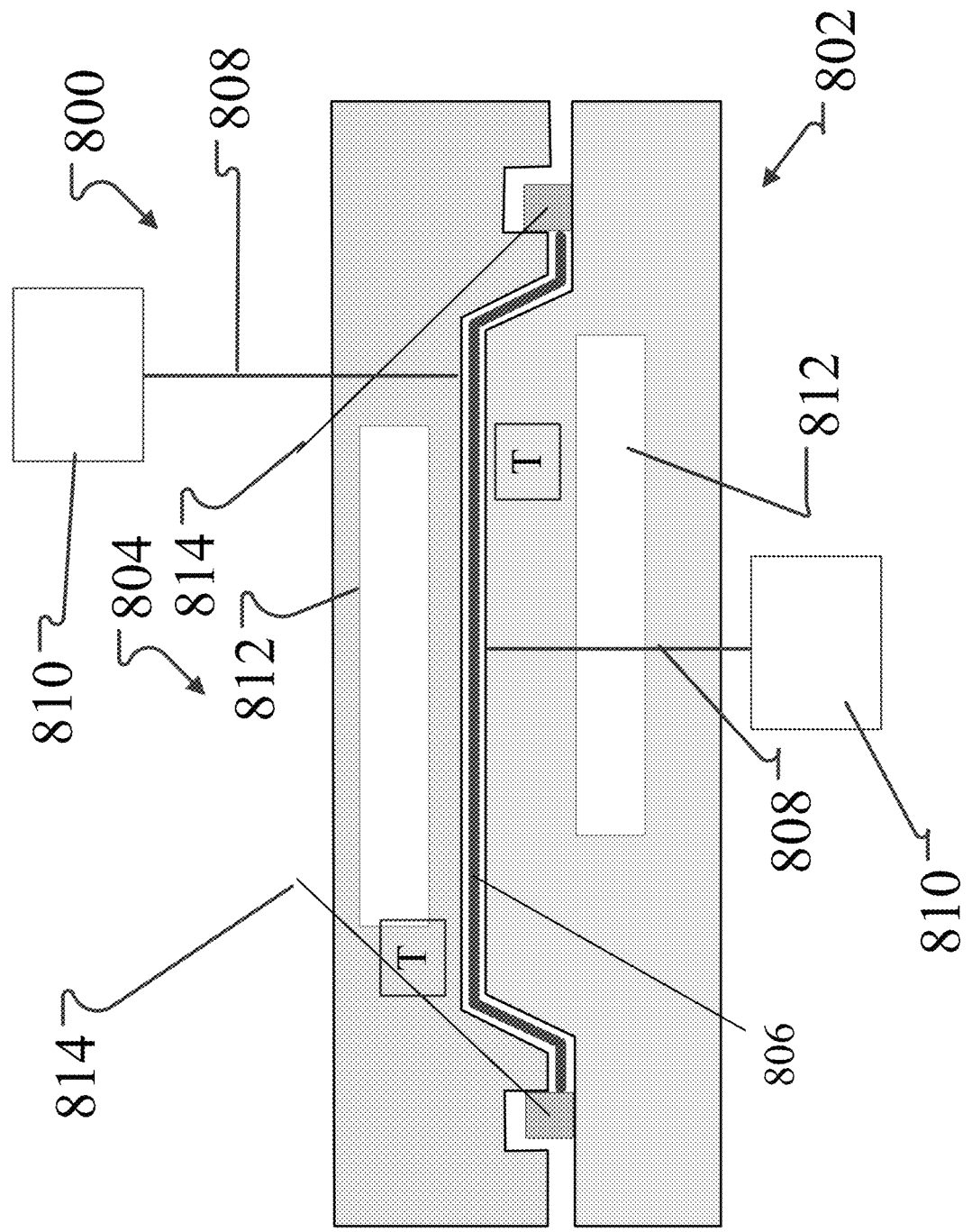
FIG. 8 depicts a partial schematic view of two molds of a press station in mating engagement.

By more precisely forming the edges of the fiber product at the initial forming stage (e.g., by using the liquid trim feature described above), less excess edge material is present when the partially-formed fiber parts are pressed at a press station. As such, the press station may utilize simplified technologies to ensure a precise edge of the finished formed fiber part. FIG. 8 depicts a partial schematic view of two molds of a press station 800 in mating engagement, and utilizing such an edge forming technology. The press station 800 includes a lower mold 802, in this case in a core mold configuration. An upper mold 804 is in the form of a part transfer mold having a cavity configuration. The terms "core mold" and "cavity mold" are described above. A fiber part 806 is disposed between the lower mold 802 and the upper mold 804. Each of the lower mold 802 and the upper mold 804 define at least one (but usually a plurality of) vacuum channels 808. The vacuum channels 808 are each connected to a dedicated vacuum source 810, the function of which is described above. Each of the lower mold 802 and the upper mold 804 each include a heating element 812. In the case of a dedicated press station 800, the elements 802-812 are utilized.

Improved control of temperature during the operation of the press station 800 is anticipated to improve the quality of the formed fiber parts and increase yield of the production line. In one example, each mold 802, 804 is provided with an internal heating element 812. The element 812 may be a simple internal passage through which a heated fluid may flow. In an alternative example, a resistive heater may be built into each mold 802, 804. Heating elements 812 are known in the art and any suitable heating technology, now known or later developed, may be used. Examples of a heated mold 802, 804 may be further provided with one or more temperature sensors T. The temperature sensors T may monitor the temperature in the mold 802, 804, of the surface of the mold 802, 804, of the fiber part 806, or at any other location in, on, or near the mold 802, 804. Furthermore, for more fine control of temperature, a mold 802, 804 may be divided into multiple segments, or sectors, and the temperature of each segment may be independently monitored and controlled. Each segment may be provided with one or more temperature sensors and one or more internal heating elements. By monitoring and controlling each sector's temperature, it is believed the performance of the mold may be further improved.

Figure 9A:
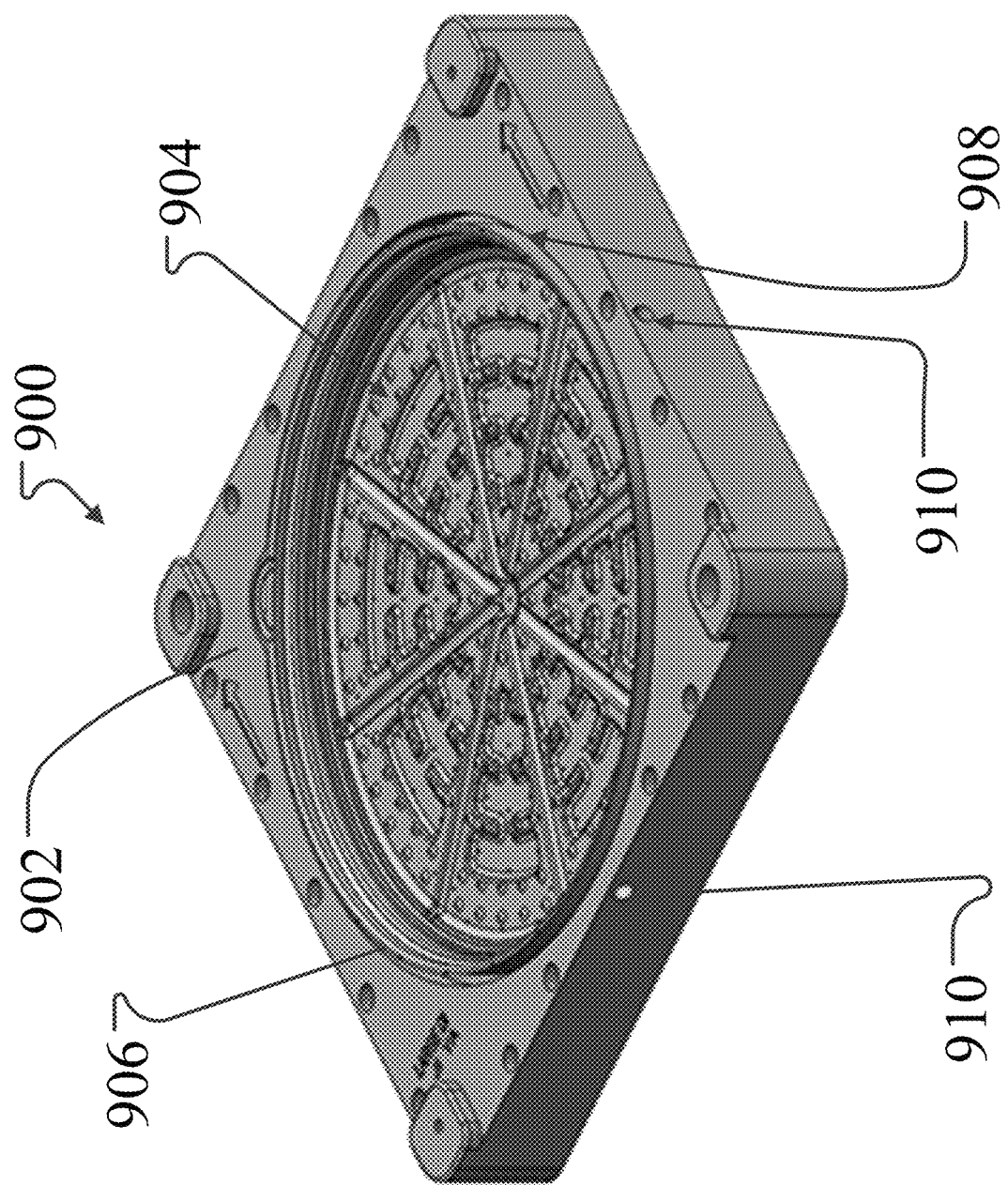
FIGS. 9A and 9B depict a perspective view and a partial enlarged perspective view, respectively, of an upper forming and trimming mold.
Figure 9B:
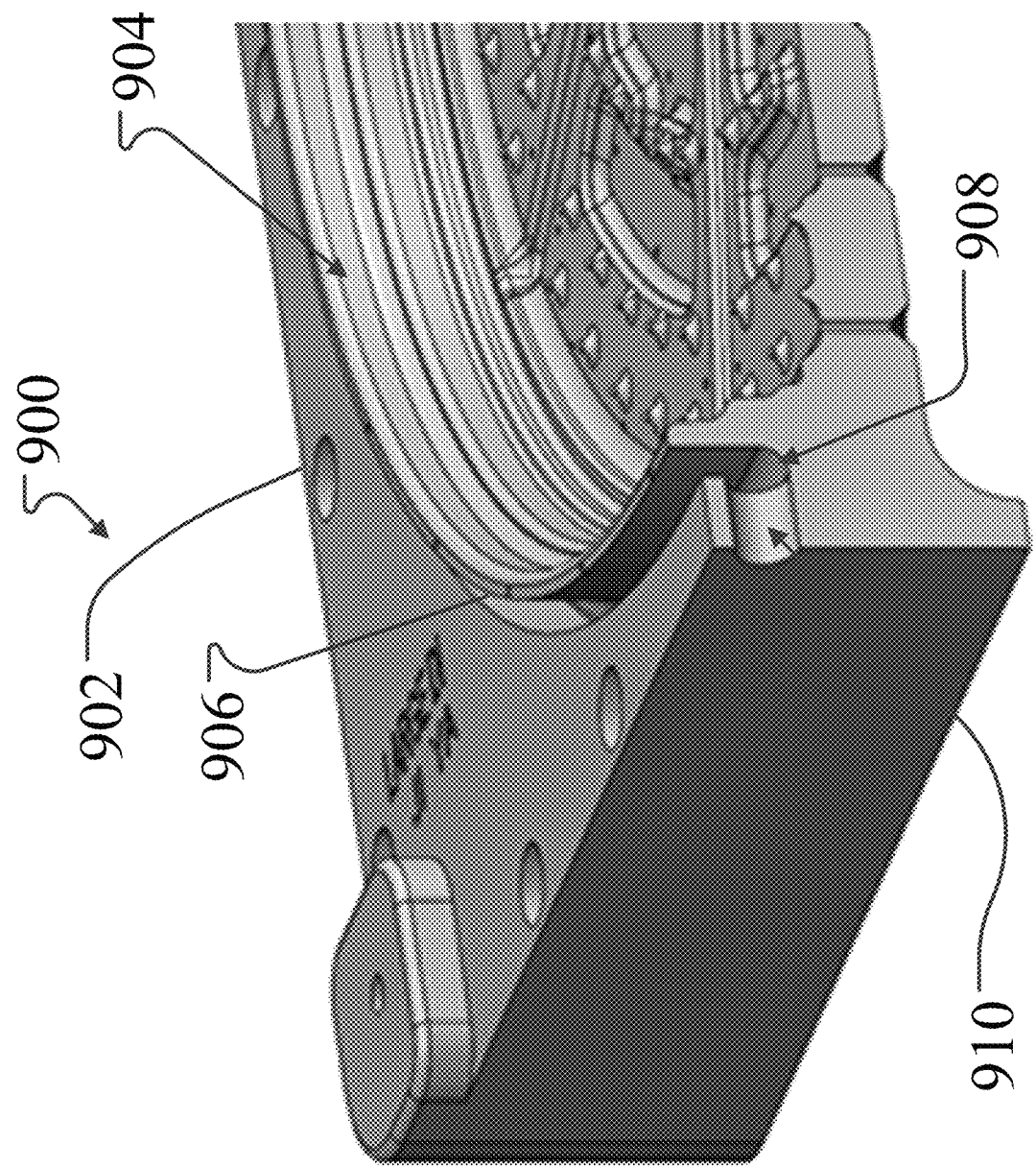

FIGS. 9A and 9B depict a perspective view and a partial enlarged perspective view, respectively, of an upper forming mold 900. FIGS. 9A and 9B are described concurrently and the mesh covering is not depicted for clarity. The upper forming mold 900 (depicted inverted in FIGS. 9A and 9B) is formed from a machined unitary part 902. In relevant part, the unitary part 902 has formed therein a mold area 904 that, in the depicted example, is defined at its outer extent by a wall 906. The wall 906 also defines an uppermost extent of the molded fiber product (not shown) formed in the mold area 904. The part 902 further defines a groove or channel 908 therearound that is utilized in the fluid trim operations described elsewhere herein. The channel 908 is in fluidic communication with one or more supply inlets 910, into which is injected a fluid for the trim operations. In the depicted mold 900, four supply inlets 910 are utilized, although other configurations are contemplated. Multiple supply inlets 910 may be desirable to evenly distribute the fluid within the channel 908. The width of the channel 908 may define the dimensions of the fluid spray ejected therefrom during trimming operations. In examples, the channel 908 may have a maximum width (e.g., a dimension extending away from the wall 906) of about 1 mm, about 2 mm, about 3 mm, about 4 mm, about 5 mm, about 6 mm, about 7 mm, about 8 mm, about 9 mm, or about 10 mm.

Figure 10A:
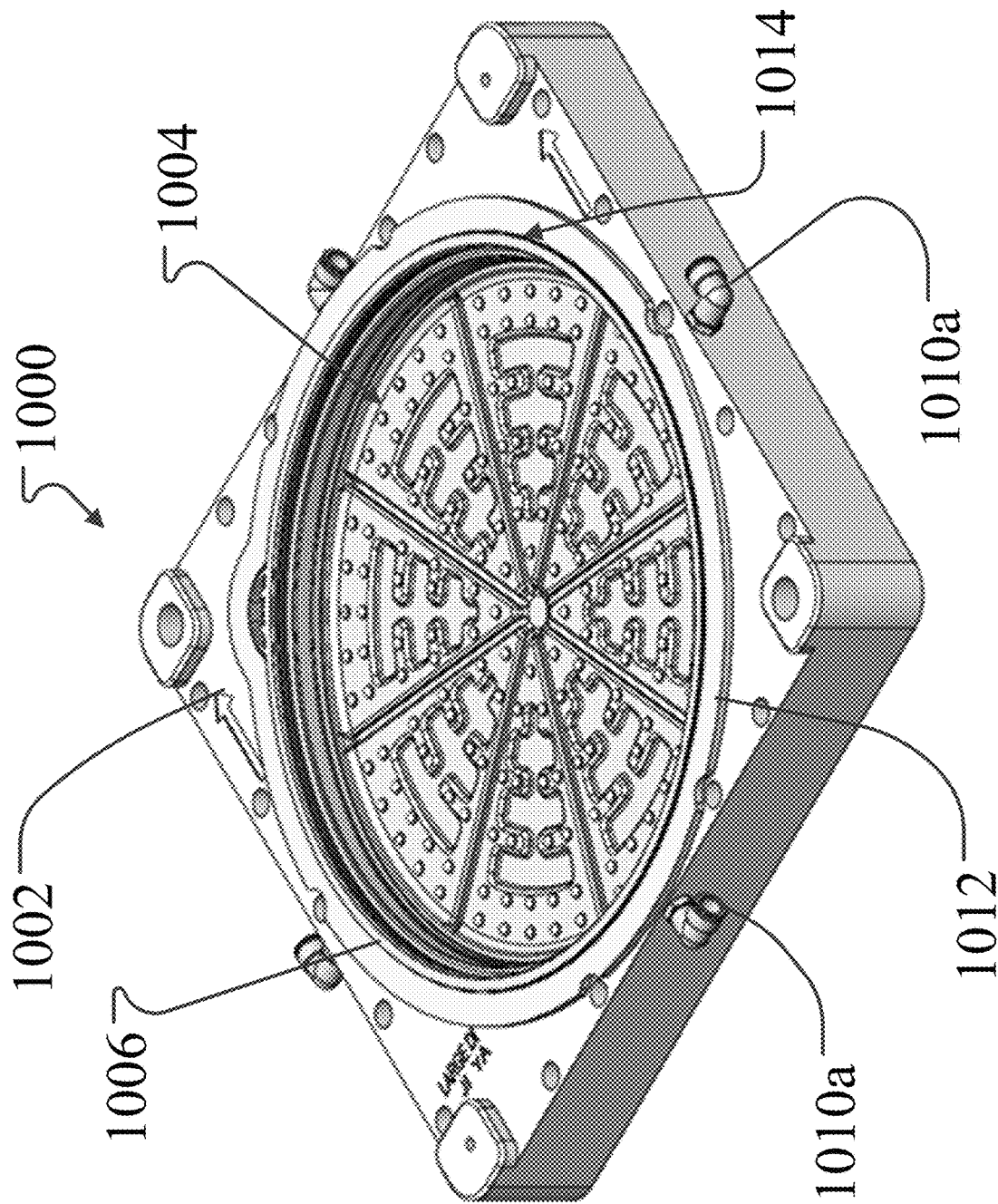
FIGS. 10A and 10B depict a perspective view and a partial section view, respectively, of an upper forming and trimming mold.
Figure 10B:
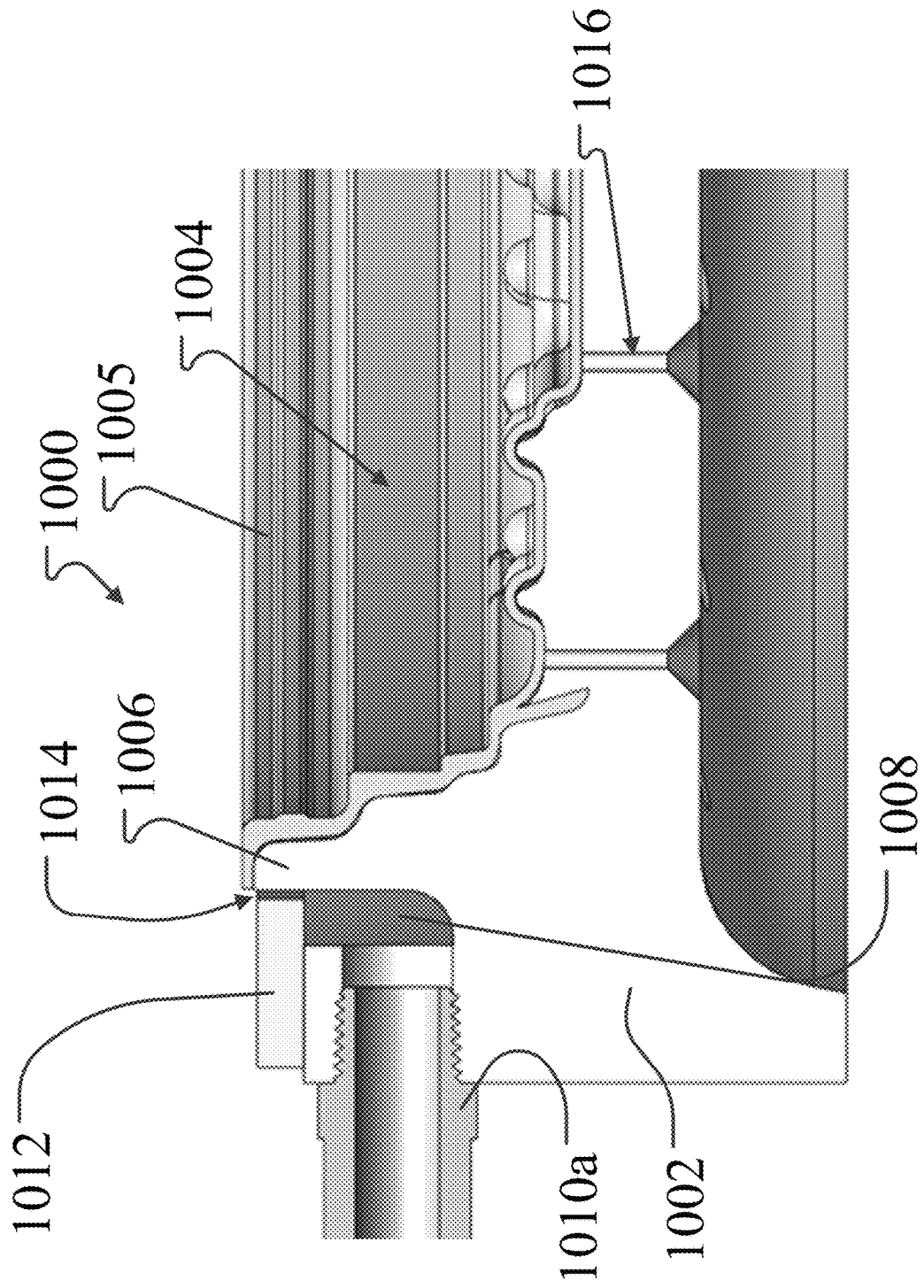

FIGS. 10A and 10B depict a perspective view and a partial enlarged section view, respectively, of an upper or first forming mold 1000. FIGS. 10A and 10B are described concurrently and a mesh covering typically utilized on forming molds is not depicted for clarity. The upper or first forming mold 1000 (depicted inverted in FIGS. 10A and 10B) is formed from a machined unitary part 1002. In relevant part, the unitary part 1002 has formed therein a mold area 1004 that, in the depicted example, is surrounded by a wall 1006 that also defines an uppermost extent of the molded fiber product 1005 formed in the mold area 1004. The part 1002 further defines a groove or channel 1008 (hidden in FIG. 10A) therearound that is utilized in the fluid trim operations described elsewhere herein. The channel 1008 is in fluidic communication with one or more supply fittings 1010a, into which is injected fluid for the trim operations described elsewhere herein. In the depicted mold 1000, four supply fittings 1010a connected to an equal number of supply inlets are utilized, although other configurations are contemplated. Multiple supply fittings 1010a and inlets may be desirable to evenly distribute the fluid within the channel 1008. The width of the channel 1008 may define the dimensions of the fluid spray ejected therefrom during trimming operations. In examples, the channel 1008 may have a maximum width (e.g., a dimension extending away from the wall 1006) of about 1 mm, about 2 mm, about 3 mm, about 4 mm, about 5 mm, about 6 mm, about 7 mm, about 8 mm, about 9 mm, or about 10 mm. Thus, if the channel 1008 or fluid outlet slot 1014 substantially surround the mold area, the fluid ejected therefrom may be in the form of a substantially annular stream. The depicted example differs from that depicted in FIGS. 9A and 9B, in that it includes a sealing ring 1012 that at least partially seals the channel 1008. In examples, the sealing ring 1012 is a discrete, replaceable part that covers the channel 1008 and defines a fluid outlet slot 1014 between the sealing ring 1012 and the wall 1006. The fluid outlet slot 1014 may have a maximum width of about 0.5 mm, about 0.75 mm, about 1 mm, about 1.25 mm, about 1.5 mm, or more. Thus, the wider channel 1008 is easier to form, mold, or machine, while the sealing ring 1012 may be used to fine-tune the size and performance of the fluid spray. The sealing ring 1012 is replaceable so that wear caused by fluid flow and pressure may be quickly remedied. The sealing ring 1012 may be formed of aluminum, steel, or other material. Further, a baffle may be disposed proximate the fitting 1010a so as to direct the fluid injected therein into a more desirable direction, so as to reduce undesirable pressure drop, turbulence, etc. In general, the fluid may be directed in a direction substantially parallel to the wall 1006, or substantially orthogonal to an uppermost extent thereof.

FIG. 10B depicts a number of vacuum channels 1016 that are connected to a vacuum source (not shown). The vacuum channels 1016 terminate at openings located within the mold area 1004 (as defined by the outer extent of the wall 1006). The channel 1008 and the outlet slot 1014 are disposed outside the mold area 1004, thus ensuring that the fluid ejected therefrom is directed at portions of the product 1005 extending beyond the wall 1006.

Figure 11:
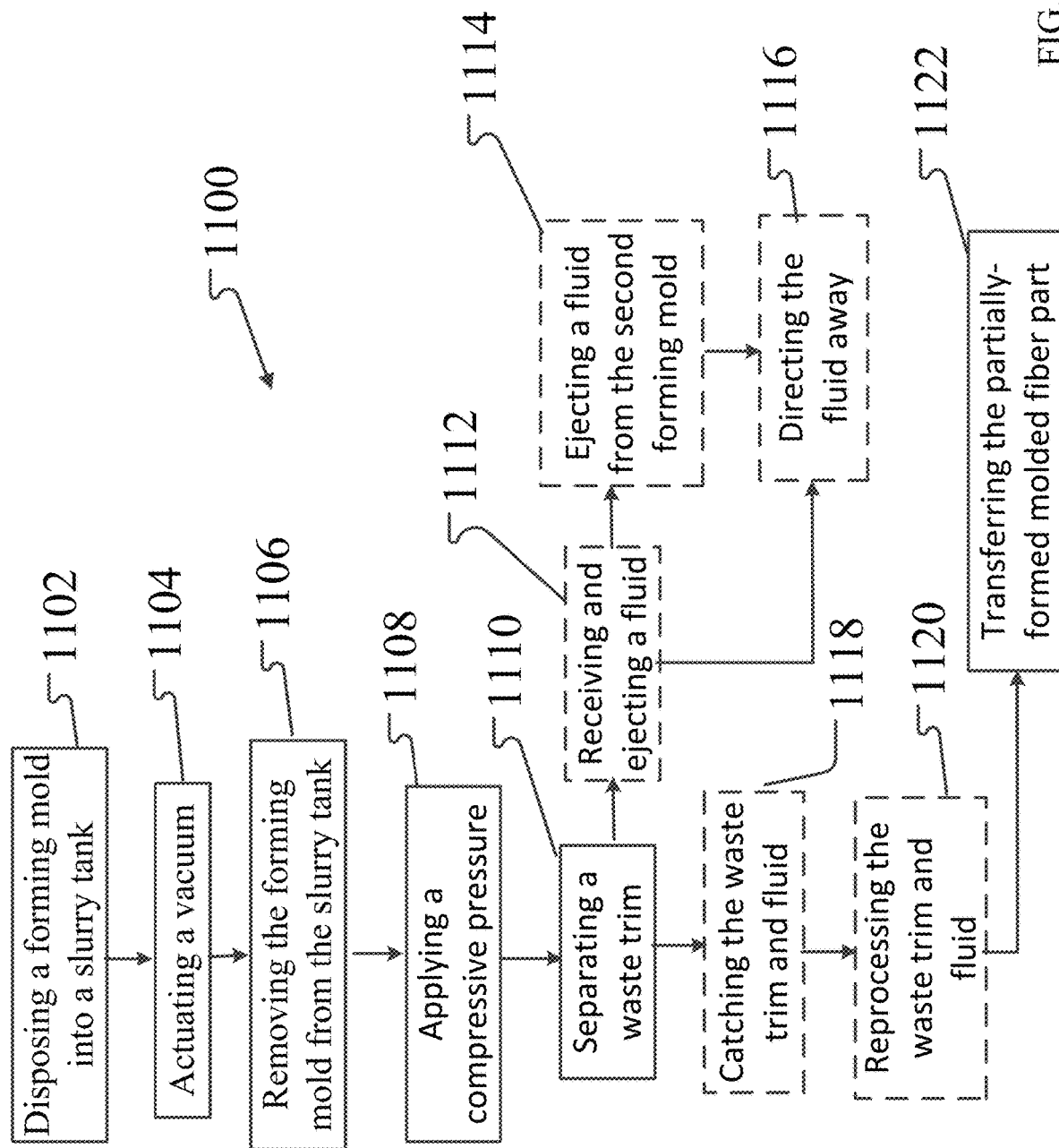
FIG. 11 depicts a method of producing a molded fiber part.

FIG. 11 depicts a method 1100 of producing a molded fiber part. The method begins with operation 1102, disposing a first forming mold into a slurry tank comprising a plurality of fibers and a liquid. The first forming mold may be any of the forming molds depicted herein or variations thereof as would be apparent to a person of ordinary skill upon reviewing this disclosure. In general, the first forming mold may include a first mold area, at least one fluid inlet, and a plurality of vacuum channels. Typically a plurality of first forming molds are disposed (e.g., lowered) in the slurry tank simultaneously, which enables forming of a plurality of fiber products simultaneously. In operation 1104, a vacuum communicatively coupled to the plurality of vacuum channels is actuated to draw at least some of the plurality of fibers onto the forming mold to form a partially-formed molded fiber part. Once a predetermined amount (based on, for example, time of vacuum application, thickness of fiber detected on the mold area, etc.) of fiber is drawn onto the first mold area, the first forming mold is removed from the slurry tank, operation 1106. A part transfer system that includes a feature such as a second forming mold is then aligned with the first forming mold and a compressive pressure is applied to the partially-formed molded fiber part, operation 1108.

The method 1100 continues with operation 1110, separating a trim from the partially-formed molded fiber part, for example, by ejecting a fluid towards an edge of the partially-formed molded fiber part. As the trim that is separated from the partially-molded fiber part is not desirable in the finished product, the trim subject to removal from the part may also be referred to as waste trim. In examples, the separation of trim may be performed substantially simultaneously with applying the compressive pressure. As described elsewhere herein, this separation of trim may be performed by a fluid-based system. The fluid may be received from the at least one fluid inlet and ejected from a fluid outlet at least partially defined by the first forming mold, operation 1112. In another example, the trim may be separated from the partially-formed fiber product by ejecting a fluid from a fluid outlet at least partially defined by the second forming mold, operation 1114. Regardless of which forming mold the fluid is ejected from, the fluid may be directed away from the first mold area, operation 1116. In examples, this may occur when the ejected fluid contacts a contoured or angled surface of an opposing portion of the mold. In examples, operations 1108 and 1110 may be performed substantially simultaneously because of the location and configuration of the various vacuum ports and fluid outlets, relative to the mold area of the first forming mold. More specifically, the plurality of vacuum channels are fluidically connected to the first mold area, and wherein the at least one fluid inlet is fluidically connected to a fluid outlet disposed on a location on the first forming mold remote from the first mold area. The fluid used in the trimming processes, as well as the trim separated during such processes, may be caught, operation 1118, and if desired, reprocessed, operation 1120. Reprocessing of the trim and fluid is described, for example, in the context of FIGS. 3 and 4. Once the trim is separated from the partially-molded fiber part, the part may be transferred to a downstream station, operation 1122.

Figure 12:
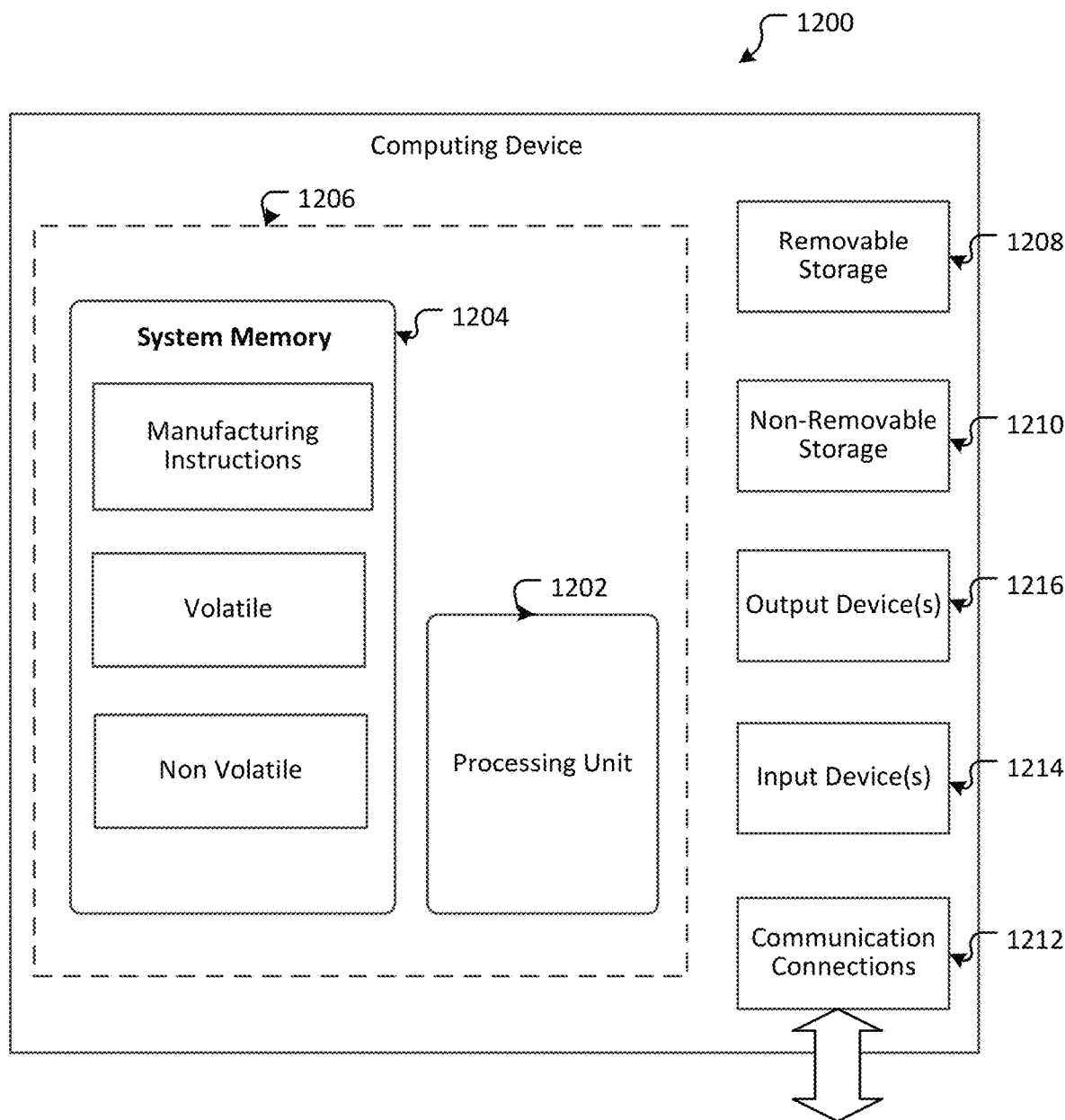
FIG. 12 illustrates one example of a suitable operating environment in which one or more of the present examples may be implemented.

FIG. 12 illustrates one example of a suitable operating environment 1200 in which one or more of the present examples may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like. In examples, the computing system may include one or more product manufacturing management systems, which may be a single unit dedicated to all stations, systems, and subsystems of the examples of productions lines described herein. In other examples, the computing system may be a network of individual computing systems (e.g., one or more discrete computing systems for each station, system, and subsystem).

In its most basic configuration, operating environment 1200 typically includes at least one processing unit 1202 and memory 1204. Depending on the exact configuration and type of computing device, memory 1204 (storing, among other things, instructions to manufacture molded fiber parts as described herein) may be volatile (such as RAM), non-volatile (such as ROM, flash memory, etc.), or some combination of the two. This most basic configuration is illustrated in FIG. 12 by dashed line 1206. Further, environment 1200 may also include storage devices (removable, 1208, and/or non-removable, 1210) including, but not limited to, magnetic or optical disks or tape. Similarly, environment 1200 may also have input device(s) 1214 such as touch screens, keyboard, mouse, pen, voice input, etc. and/or output device(s) 1216 such as a display, speakers, printer, etc. Also included in the environment may be one or more communication connections, 1212, such as LAN, WAN, point to point, Bluetooth, RF, etc.

Operating environment 1200 typically includes at least some form of computer readable media. Computer readable media can be any available media that can be accessed by processing unit 1202 or other devices utilizing the operating environment. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1200 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some examples, the components described herein include such modules or instructions executable by computer system 1200 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 1200 is part of a network that stores data in remote storage media for use by the computer system 1200.

Figure 13:
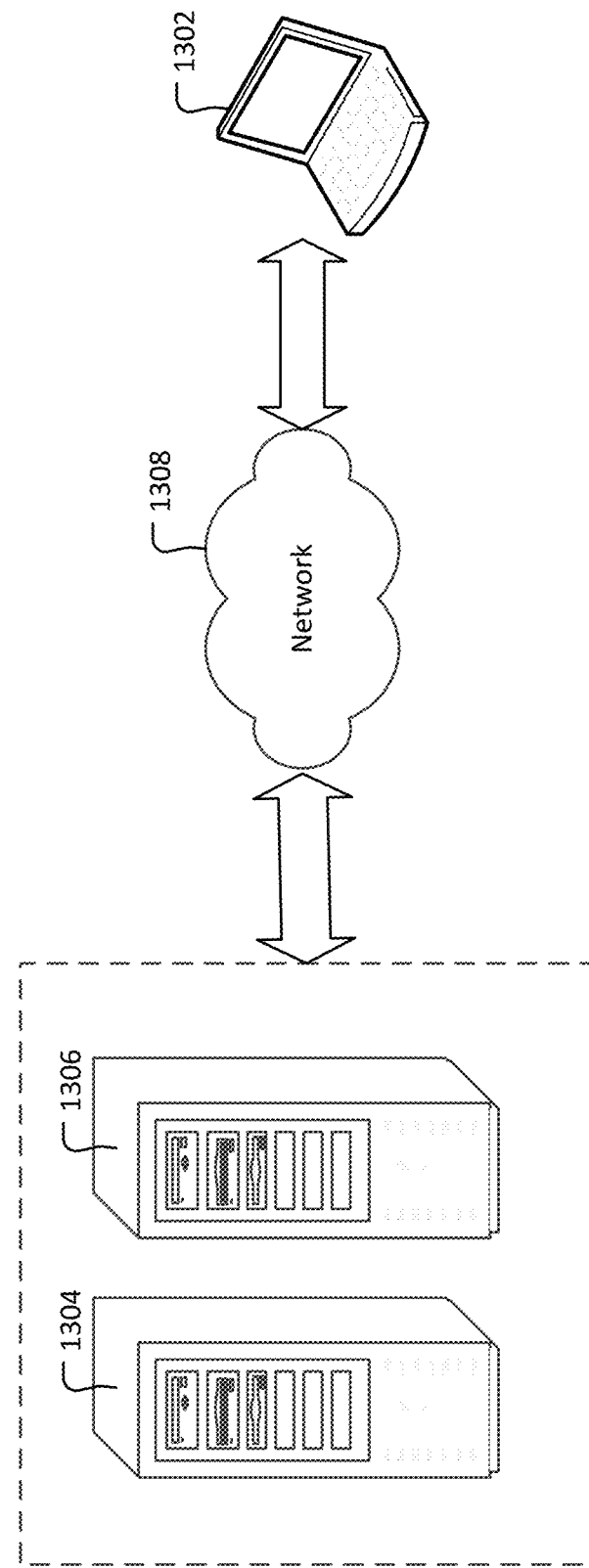
FIG. 13 is an example of a network in which the various systems and methods disclosed herein may operate.

FIG. 13 is an example of a network 1300 in which the various systems and methods disclosed herein may operate. In examples, portable device, such as client device 1302, may communicate with one or more servers, such as servers 1304 and 1306, via a network 1308. In examples, a client device may be a laptop, a tablet, a personal computer, a smart phone, a PDA, a netbook, or any other type of computing device, including individual controllers for various components of the packing system, and the computing device in FIG. 12. In examples, servers 1304 and 1306 may be any type of computing device, such as the computing device illustrated in FIG. 12. Network 1308 may be any type of network capable of facilitating communications between the client device and one or more servers 1304 and 1306. Examples of such networks include, but are not limited to, LANs, WANs, cellular networks, and/or the Internet.

In examples, the various systems and methods disclosed herein may be performed by one or more server devices. For example, in one example, a single server, such as server 1304 may be employed to perform the systems and methods disclosed herein. Portable device 1302 may interact with server 1304 via network 1308 in send testing results from the device being tested for analysis or storage. In further examples, the portable device 1302 may also perform functionality disclosed herein, such as by collecting and analyzing testing data.

In alternate examples, the methods and systems disclosed herein may be performed using a distributed computing network, or a cloud network. In such examples, the methods and systems disclosed herein may be performed by two or more servers, such as servers 1304 and 1306. Although a particular network example is disclosed herein, one of skill in the art will appreciate that the systems and methods disclosed herein may be performed using other types of networks and/or network configurations.

The examples described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method of producing a molded fiber part, the method comprising:
   disposing a first forming mold into a slurry tank comprising a plurality of fibers and a liquid, wherein the first forming mold comprises a first mold area, at least one fluid inlet, and a plurality of vacuum channels;
   actuating a vacuum communicatively coupled to the plurality of vacuum channels to draw at least some of the plurality of fibers onto the forming mold to form a partially-formed molded fiber part;
   removing the first forming mold from the slurry tank;
   applying a compressive pressure to the partially-formed molded fiber part with a second forming mold;
   separating a waste trim from the partially-formed molded fiber part substantially simultaneously with applying the compressive pressure; and
   subsequent to separating the waste trim, transferring the partially-formed molded fiber part to a downstream station,
      wherein separating the waste trim comprises receiving a fluid from the at least one fluid inlet and ejecting the fluid from a fluid outlet at least partially defined by the first forming mold.

2. The method of claim 1, wherein the plurality of vacuum channels are fluidically connected to the first mold area, and wherein the at least one fluid inlet is fluidically connected to a fluid outlet disposed on a location on the first forming mold remote from the first mold area.

3. The method of claim 1, further comprising directing the ejected fluid away from the first mold area.

4. The method of claim 1, further comprising catching the waste trim and the fluid.

5. The method of claim 4, further comprising, subsequent to catching the waste trim and the fluid, reprocessing the waste trim and the fluid.

6. The method of claim 1, wherein separating the waste trim comprises ejecting a fluid towards an edge of the partially-formed molded fiber part.

7. The method of claim 6, wherein the fluid is ejected in a substantially annular stream.

8. The method of claim 1, wherein the fluid outlet comprises a slot.

9. The method of claim 8, wherein the slot is at least partially defined by a sealing ring.

* * * * *